United States Patent [19]

Taniguchi et al.

[11] Patent Number: 5,068,737
[45] Date of Patent: Nov. 26, 1991

[54] IMAGE SENSOR HAVING MULTIPLE PAIRS OF ARRAY SENSORS

[75] Inventors: Nobuyuki Taniguchi, Nishinomiya; Toshihiko Karasaki, Sakai; Tokuji Ishida, Daito; Masataka Hamada, Minamikawachi; Toshio Norita, Sakai, all of Japan

[73] Assignee: Minolta Camera Kabushiki Kaisha, Osaka, Japan

[21] Appl. No.: 656,107

[22] Filed: Feb. 13, 1991

Related U.S. Application Data

[60] Continuation of Ser. No. 578,081, Sep. 5, 1990, abandoned, which is a division of Ser. No. 353,813, May 18, 1989, Pat. No. 4,979,045, which is a division of Ser. No. 5,413, Jan. 20, 1987, Pat. No. 4,835,615.

[30] Foreign Application Priority Data

Jan. 21, 1986 [JP] Japan .................................. 61-11537
Mar. 14, 1986 [JP] Japan .................................. 61-57855

[51] Int. Cl.$^5$ .............................................. H04N 3/14
[52] U.S. Cl. .................................... 358/227; 354/400
[58] Field of Search .................... 358/213.19, 213.11, 358/213.16, 213.23–213.26, 221, 228; 354/400, 25; 250/201 AF

[56] References Cited

U.S. PATENT DOCUMENTS

| | | | |
|---|---|---|---|
| 4,373,791 | 2/1983 | Araki | 354/25 |
| 4,410,258 | 10/1983 | Aoki et al. | 354/25 |
| 4,410,804 | 10/1983 | Stauffer | 250/578 |
| 4,563,576 | 1/1986 | Matsumara et al. | 354/406 |
| 4,636,624 | 1/1987 | Ishida et al. | 250/201 |
| 4,644,582 | 2/1987 | Morishita et al. | 382/6 |
| 4,766,302 | 8/1988 | Ishida et al. | 250/201 |
| 4,835,615 | 5/1989 | Taniguchi et al. | 358/213.19 |
| 4,858,128 | 8/1989 | Nowak | 382/6 |
| 4,859,842 | 8/1989 | Suda et al. | 250/201 |

FOREIGN PATENT DOCUMENTS 58-194007 11/1983 Japan .
59-174807 3/1984 Japan .
62-95511 5/1987 Japan .

Primary Examiner—Stephen Brinich
Attorney, Agent, or Firm—Price, Gess & Ubell

[57] ABSTRACT

An image sensor system for sensing an image of an object includes a plurality of image sensor arrays. Each array comprises photoelectric converting elements arranged to receive the object image and accumulation cells coupled to each photoelectric converting element for accumulating charges produced from the photoelectric converting element. A buffer memory cells are coupled respectively to the accumulation cells for temporarily storing the accumulated charges shifted from the accumulation cells in response to the completion of the charge accumulation in each array. A shift register is provided to receive accumulated charges from the buffer memory cells in every one of the arrays after all the arrays complete the charge accumulation. The accumulated charges stored in the shift register are then sequentially outputted.

37 Claims, 25 Drawing Sheets

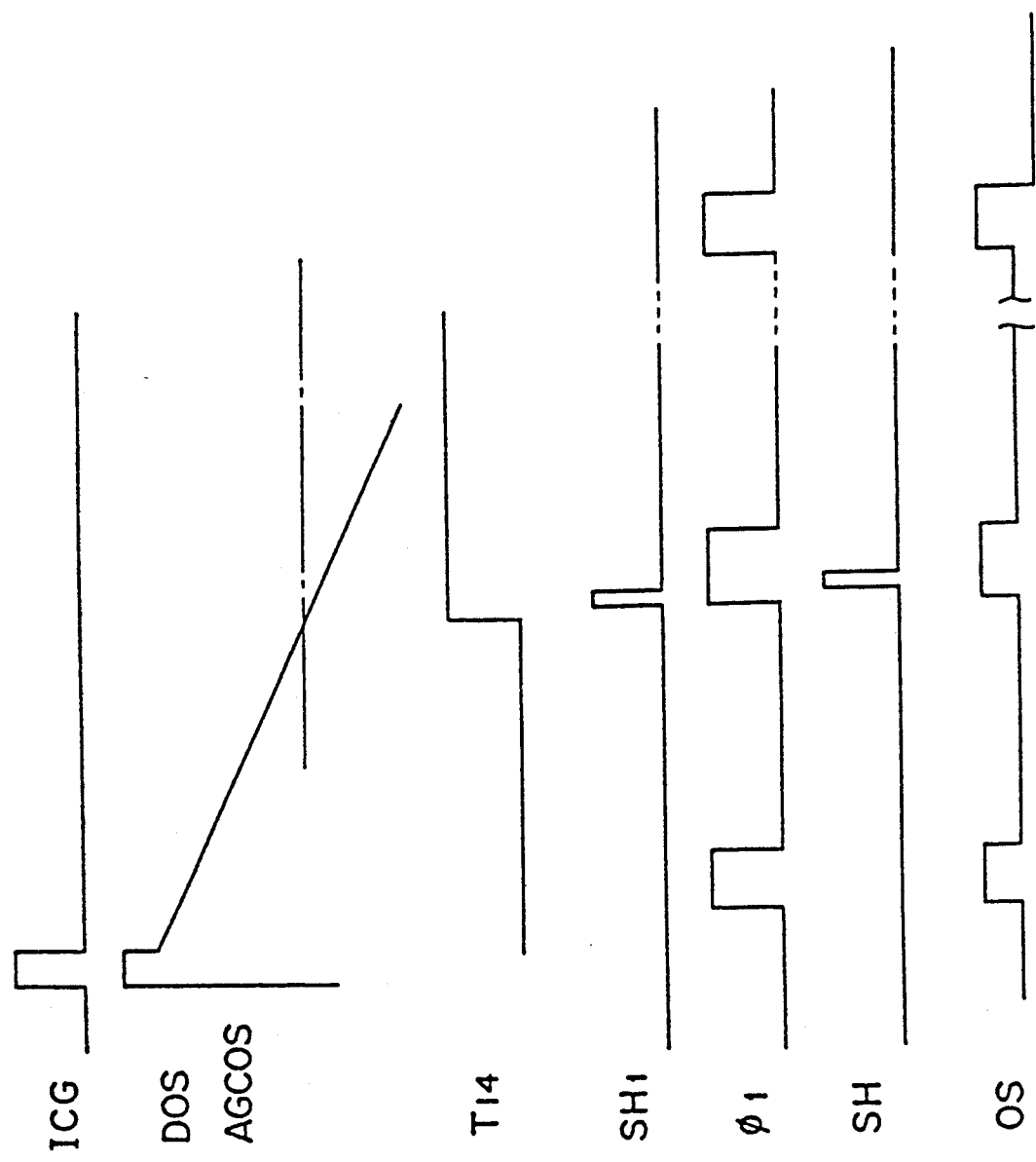

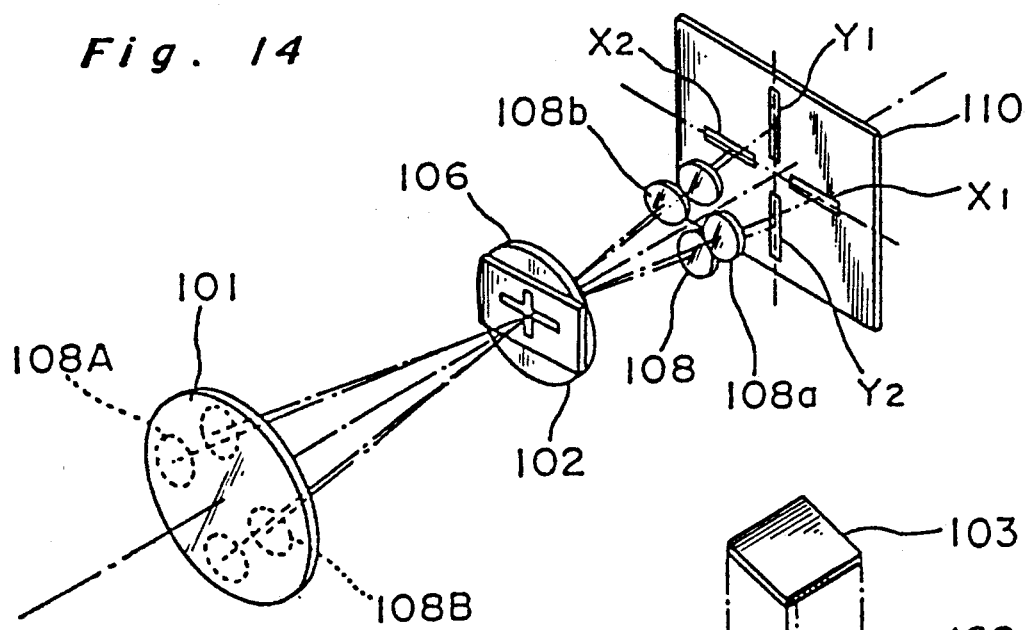
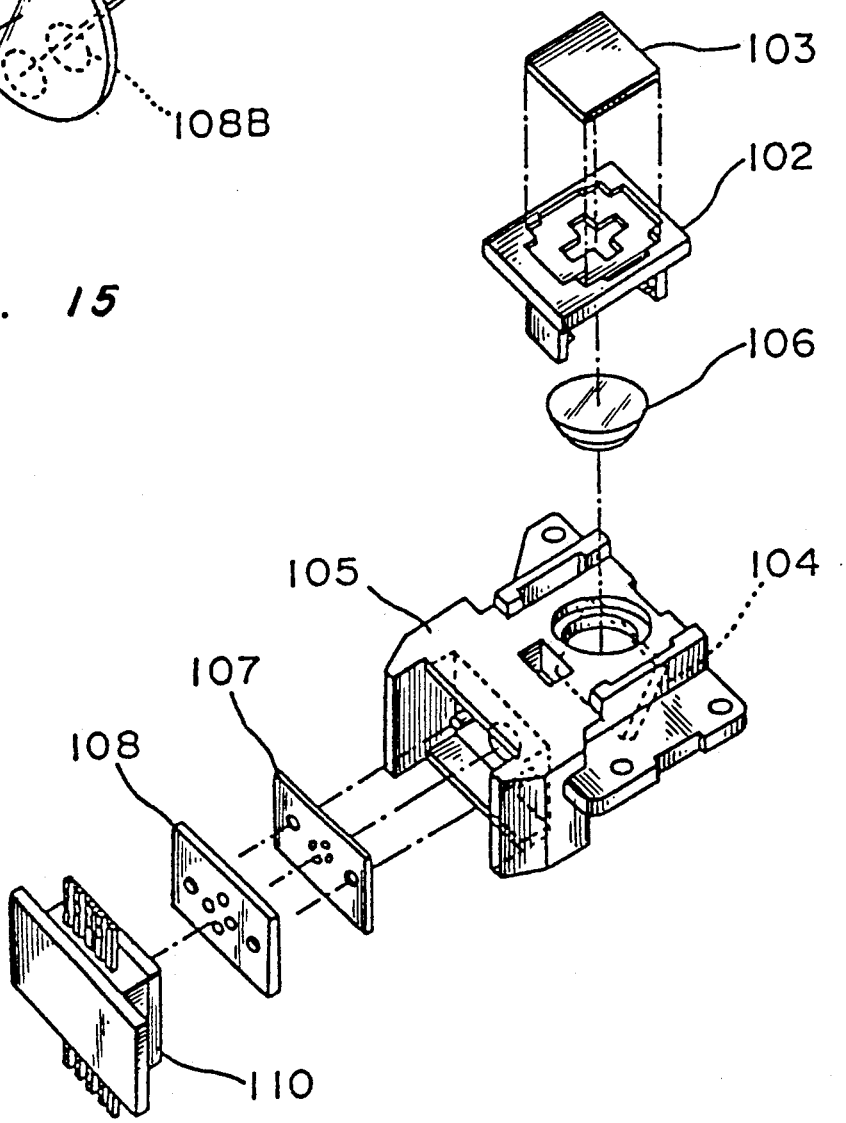

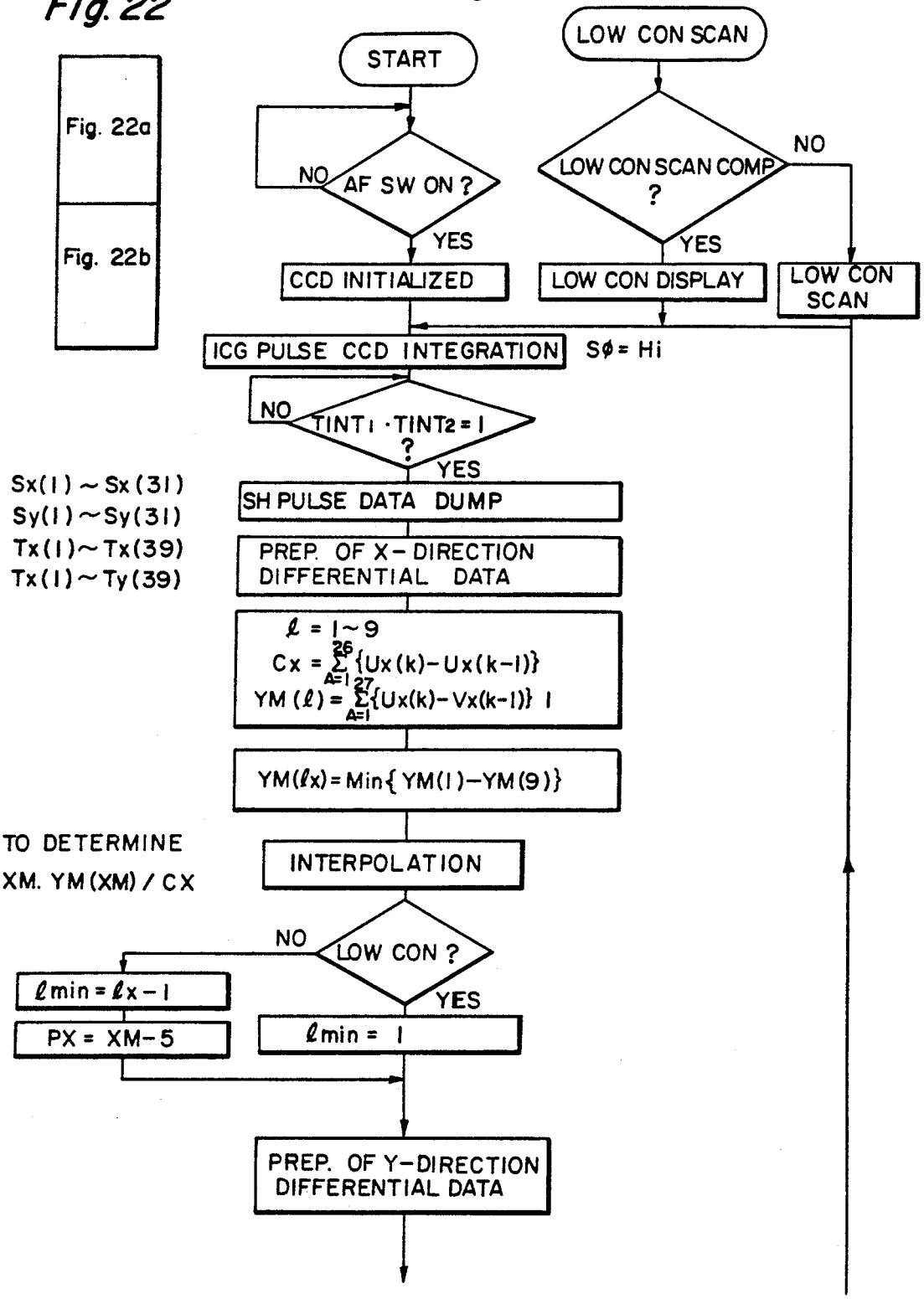

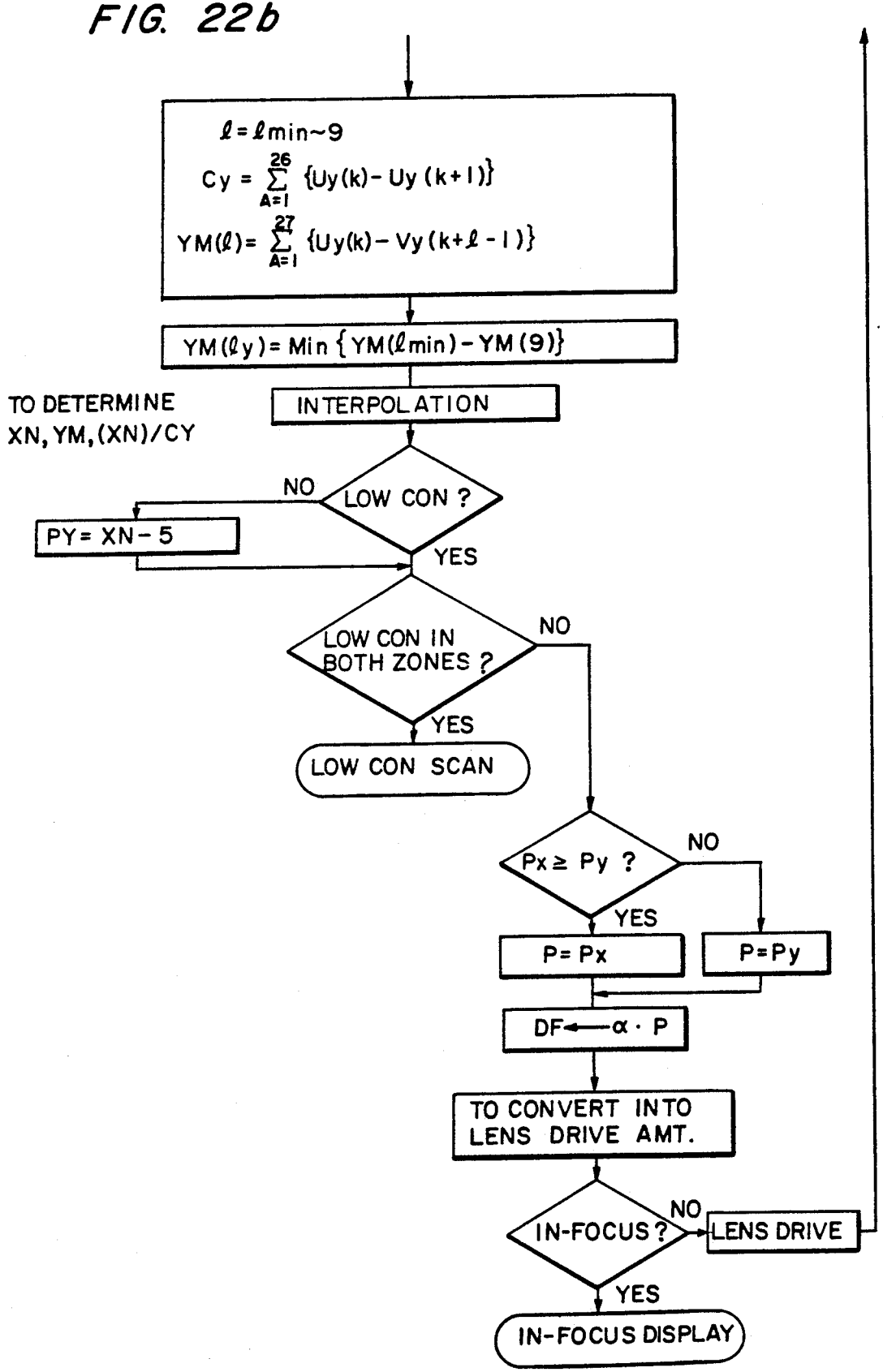

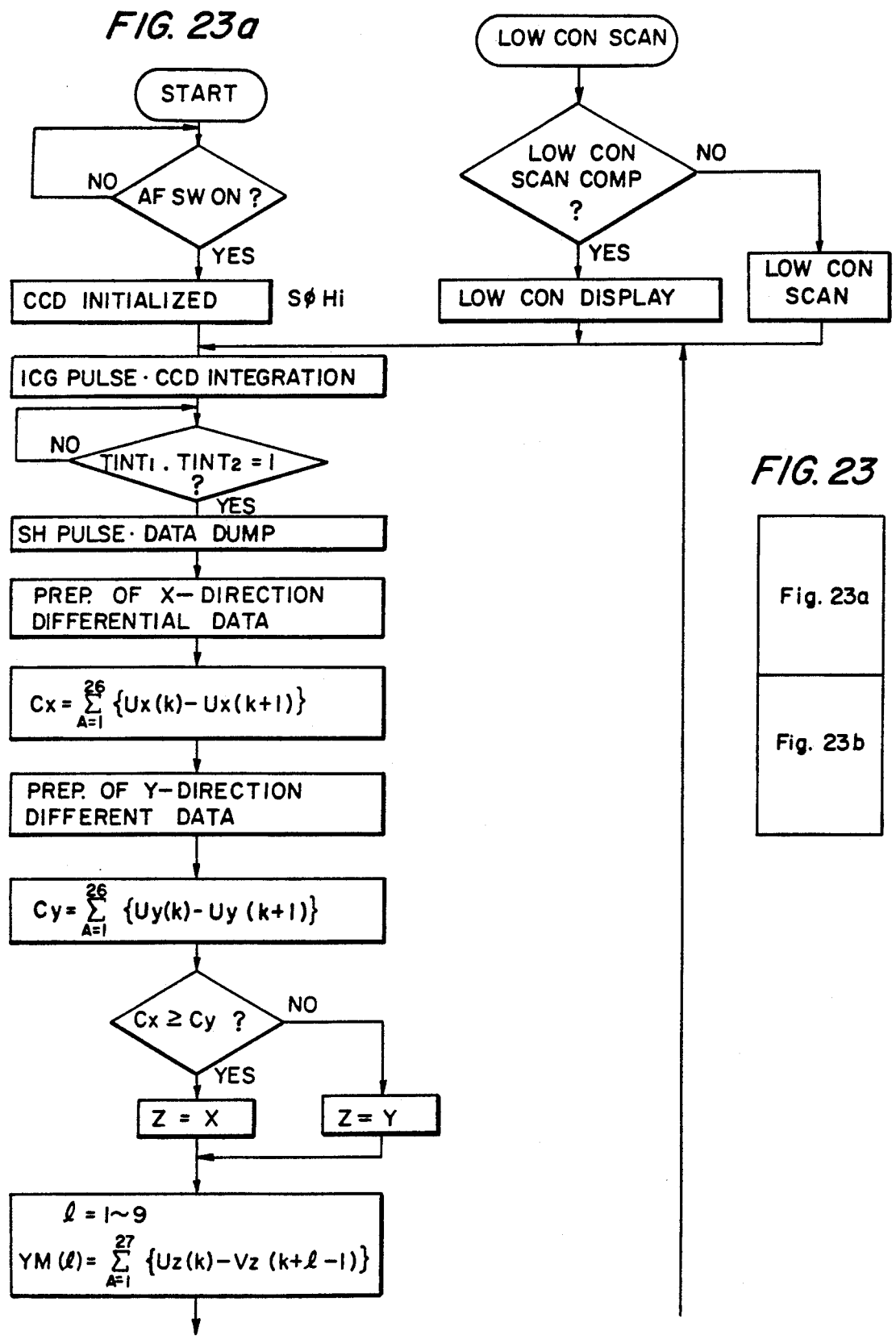

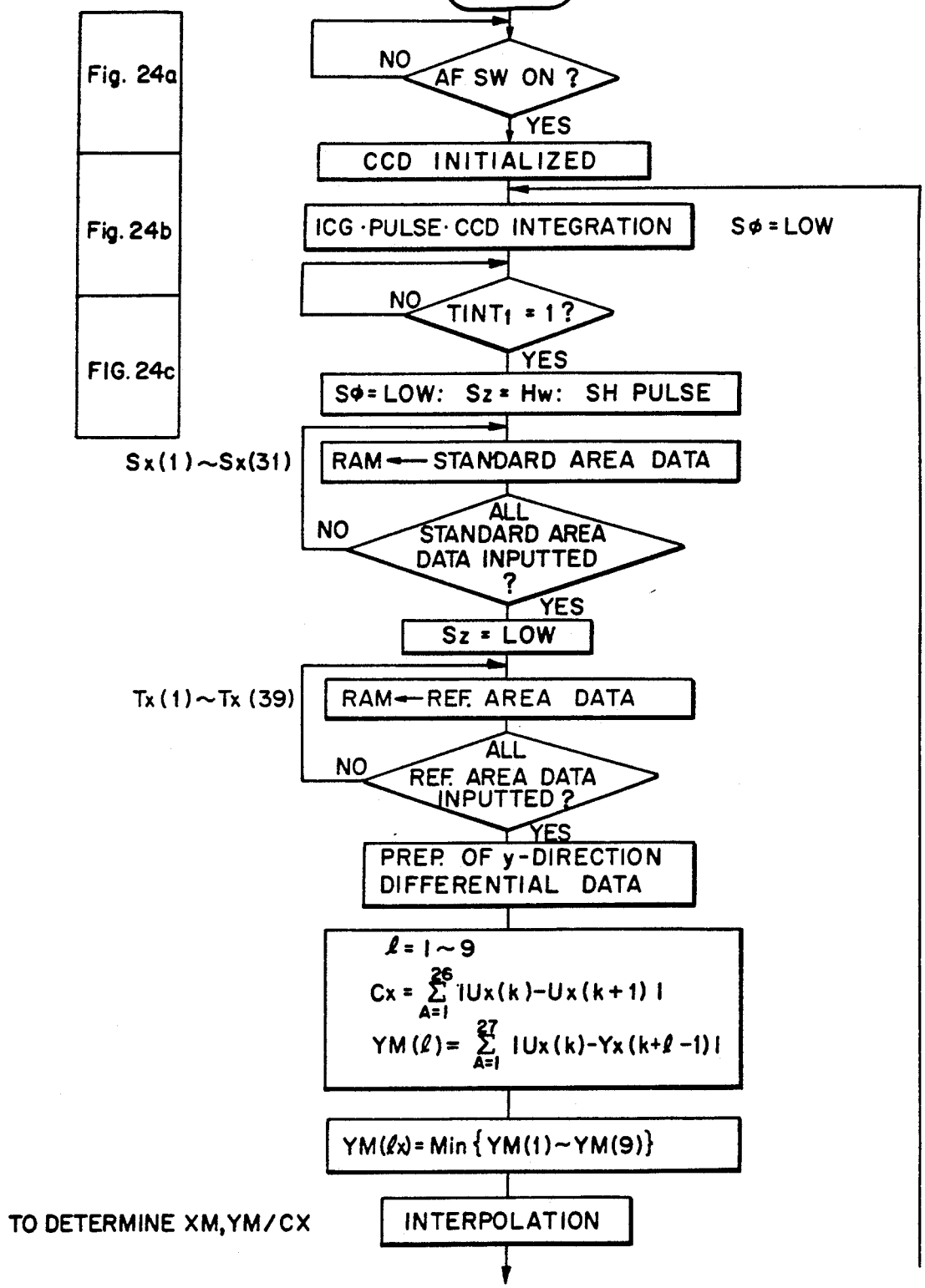

IMAGE SENSOR HAVING MULTIPLE PAIRS OF ARRAY SENSORS

This is a continuation of application Ser. No. 578,081, filed on Sept. 5, 1990, for an IMAGE SENSOR HAVING MULTIPLE PAIRS OF ARRAY SENSORS, now abandoned, which is a division of U.S. Ser. No. 353,813, filed on May 18, 1989, now U.S. Pat. No. 4,979,045, which is a division of U.S. Ser. No. 005,413, filed on Jan. 20, 1987 and issued as U.S. Pat. No. 4,835,615 on May 30, 1989.

CROSS REFERENCE TO THE RELATED APPLICATION

This application is related to the following patents and applications.

U.S. Pat. No. 4,550,993 issued 11/5/85;

U.S. patent application Ser. No. 763,338 filed 8/6/85, which is a continuation of Ser. No. 669,107, filed 11/6/84, abandoned;

U.S. patent application Ser. No. 905,686, filed 9/9/86, now U.S. Pat. No. 4,783,701 issued 11/8/88, which is a continuation of Ser. No. 763,338, filed 8/6/85, now U.S. Pat. No. 4,660,955 issued 4/28/87, which is a continuation of Ser. No. 669,107, filed 11/7/84, abandoned, and is a divisional application of Ser. No. 353,813.

BACKGROUND OF THE INVENTION

1. Field of the Invention

The present invention relates to a image sensor having a plurality of lines of charge accumulation type photo-sensor arrays and also to an image sensing system utilizing such an image sensor.

2. Description of the Prior Art

In the case of image sensors or image sensing systems having a single charge accumulation type photosensor array such as a CCD (charge coupled device), it is well known to control the charge accumulation time of the photosensor array in accordance with the brightness of a target object as detected by a monitoring photosensor element arranged adjacent the photosensor array. Also in the case of image sensors or image sensing systems having a plurality of charge accumulation type photosensor arrays, proper charge accumulation time controls for the respective photosensor arrays are required in order to obtain high quality image signals without causing overtime charge accumulation in any of the photosensor arrays. However, such proper charge accumulation time controls have not been realized in prior art image sensor or image sensing system having a plurality of charge accumulation type photosensor arrays. For example, in U.S. Pat. No. 4,410,258 which discloses an image sensor employing two charge accumulation type photosensor arrays for focus detection, two monitoring photodiodes are arranged adjacent the photosensor arrays in a corresponding relation to detect the brightness of a target object, images of which are formed on the photosensor arrays. The monitoring photodiodes are connected with one another, so that the sum of their outputs is compared with a reference voltage signal to control the charge accumulation time for both of the photosensor arrays. However, since the sum of the outputs of the monitoring diodes does not always reflect the brightness of the target object whose images are formed on the photosensor arrays, correctly, it is considered that there will occur overtime charge accumulation in the photosensor arrays. In Japanese Patent Laid-Open Publication No. 59-174807, there is also disclosed an image sensing system employing a plurality of charge accumulation type photosensor arrays but there is no mention about charge accumulation time control for the respective photosensor arrays.

Another problem to be solved in image sensors or image sensing systems having a plurality of charge accumulation type photosensor arrays is how to take out the outputs of the respective photosensor arrays. If the outputs of the respective photosensor arrays are taken out parallelly with each other so as to be processed by separate processing circuits, not only the whole circuit arrangement becomes complicated but also adjustment of behaviors of the respective processing circuits becomes necessary. Therefore, it is desirable to take out the outputs of the respective photosensor arrays sequentially through a single output gate. However, in this case, the image sensors are required to hold the outputs of the photosensor arrays after termination of charge accumulation until the sequence comes to predetermined stages for taking out the respective outputs. More particularly, during a stage in which the output of one of the photosensor array is taken out, the outputs of the remaining photosensor arrays which have not been taken out should be held without being subjected to any inadvertent change. Thus, a proper measure is required to solve this problem.

Still another problem to be solved in an image sensor or image sensing system having a plurality of charge accumulation type photosensor arrays is compensation of dark current which is inherent and characteristic to the respective photosensor arrays. This problem is particularly serious when the outputs of the respective photosensor arrays are to be taken out sequentially through a single output gate so as to be processed by a single processing circuit.

Yet another problem to be solved in an image sensor or image sensing system having a plurality of charge accumulation type photosensor arrays is control of the magnitudes of the outputs of the respective photosensor arrays to be subjected to later stage processing such as A/D (analog-to-digital) conversion.

FIG. 1 shows a prior art image sensor having a single charge accumulation type photosensor array and FIG. 3 shows a driving circuit therefor. Explanation is given of the construction and operation of this prior art image sensor and the driving circuit therefor for facilitating understanding of the charge accumulation time control with use of a monitoring photosensor element.

Referring to FIG. 1, the prior art image sensor 1 includes an array of photoelectric converting elements EAn (n=1, 2, ..., m), an array of charge accumulation elements FAn, charge shift registers CAn and CBn, a number of gates FG1, CG1, SG1, etc, and an output stage in which an output terminal T12 produces electric signals OS indicating the light intensity of an image formed on the array of the photoelectric converting elements. Provided adjacent the array of the photoelectric converting elements is a monitor photodiode MP which produces a photocurrent. A circuit MC produces from an output terminal T10 a voltage signal AGCOS indicating an integration of the photocurrent produced by the monitor photodiode MP. An output terminal T11 produces a signal DOS used as a reference voltage for signals OS and AGCOS.

Now, the description is particularly directed to the signal generated by the array of photoelectric converting elements EAn as outputted from terminal T12.

When an integration clear pulse ICG (hereinafter referred to as ICG pulse) is applied at terminal T6, MOS transistors CGn provided between each charge accumulation element FAn and power source VLD turn on to initialize each charge accumulation element FAn and, at the same time, a MOS transistor MCG, connected between the power source VLD and a floating gate MGF for monitor photodiode MP, turns on to clear the output of the monitor photodiode MP. In this operation, all the photoelectric converting elements EAn are once charged up to a level approximately equal to the voltage of the power source.

Thereafter, when the ICG pulse disappears, the discharge starts at a speed relative to the intensity of the light impinging on each photoelectric converting element. Since such a discharge can be regarded as a negative charge, the term "charge" used herein does not only mean the charge in the positive direction, but also in the negative direction. Then, the charge which is in radiation to the intensity of light impinging on each photoelectric converting element EAn and as generated from each photoelectric converting element EAn is transferred through the respective floating gate FGn to the corresponding charge accumulation element FAn. The charge produced by the monitor photodiode MP is transmitted through the floating gate MFG to a charge accumulation capacitor, thereby producing from terminal T10 the signal AGCOS representing, at real time, the condition of the accumulated charge. When the level of the signal AGCOS drops to a predetermined level, indicating that each photoelectric converting element EAn has produced an appropriate amount of charge for processing the signal in the later stage, an SH pulse is applied to turn the gate SGn on, thereby transmitting the charges accumulated in the charge accumulation elements FAn parallelly to the corresponding charge shift registers CAn. Thus, the charge integration is completed.

Each shift gate SGn defines a potential well during the "HIGH" period of the transfer clock $\Phi 1$, which is provided for driving the charge shift registers CAn. Since shift gates SGn are connected to the corresponding charge shift registers CAn, it is necessary to synchronize the generation of the shift pulse SH with the phase of the transfer clock $\Phi 1$ such that shift pulse SH of a HIGH level is generated after the transfer clock $\Phi 1$ is made HIGH and transfer clock $\Phi 2$ is made LOW to define the potential well in connection to the shift registers CAn. Thus, in response to the generation of the shift pulse SH, the MOS transistors SGn connected between the charge accumulation elements FAn and shift registers CAn turn on to inject the charges accumulated during the integration period in the potential well.

Thereafter, in response to the HIGH level of the clock pulse $\Phi 1$, the charges stored in shift registers CAn are simultaneously transferred to adjacent shift registers CBn located, when viewed in FIG. 1, on the right hand side of the shift register CAn. Then, in response to the HIGH level of the clock pulse $\Phi 2$, the charges stored in shift registers CBn are simultaneously transferred to adjacent shift registers CAn-1. Thus, in response to the trailing edge of each clock pulse $\Phi 1$, the charges are outputted sequentially from the shift register CB0 located at the most right-hand side of the array. Thus, the first charge that will be outputted in synchronization with the trailing edge of the clock pulse $\Phi 1$ from the shift register CB0 will be the charge generated by the photoelectric converting element EA1. The charges outputted from the shift register CB0 are converted by a buffer circuit Vs to voltage signals, and are outputted from terminal T12 as voltage signals OS.

The circuit shown in FIG. 3 is disclosed, for example, in U.S. patent application Ser. No. 763,338 assigned to the same assignee as the present application. In FIG. 3, a reference number 1 designates the image sensor; 10 designates transfer clock pulse generator; 20 designates a digital signal generator for generating, in response to the signal obtained from the image sensor, digital signals which will be used as a base for detecting the focusing condition of the camera's objective lens; and 30 is a microcomputer which determines, using the digital signal from the circuit 20, the focusing condition of the camera's objective lens and also controls the operation of various circuits.

A reference number 40 is a brightness detecting circuit, a detail of which is shown in FIG. 4, for detecting the brightness of the object based on the output of the brightness monitoring circuit provided in the image sensor 1 to control the amplification of the amplifier OP provided in the circuit 20 and also for controlling the charge accumulation time (photocurrent integration time) in the image sensor 1; AN1 and AN2 are AND gates which define a gate means together with an OR gate OR1; DF1 is a D flip-flop which generates a reset pulse that resets flip-flops FF0, and flip-flops FF1-FF6 (described later); DF2 is a D flip-flop for generating a shift pulse SH for shifting charges accumulated in the charge accumulation elements FAn to charge shift registers CAn; CL1 is a clock pulse generator for generating standard clock pulses; and FF0 is an R-S flip-flop.

As shown in FIG. 3, the shift clock pulse generator 10 for generating transfer clock pulses $\Phi 1$ and $\Phi 2$ includes flip-flops FF1-FF6 for dividing the clock pulses. The first flip-flop FF1 receives to its T terminal the clock pulses (one cycle period=2 microseconds) from the clock pulse generator CL1. The Q terminals of flip-flop FF3, FF4, FF5 and FF6 are connected inputs of OR gate OR2 which is in turn connected to one input of AND gate AN4. The other input of the AND gate AN4 is connected through an inverter IN1 to a terminal T22 of microcomputer 30. When terminal T22 produces a signal of logic "0", AND gate AN4 is enabled to permit the signal "1" from OR gate OR2 to pass therethrough. An AND gate AN5 has its one input connected to a clock pulse generator CL2 and the other input thereof connected to terminal T22. Thus, when terminal T22 produces a signal of logic "1", AND gate AN5 is enabled to transmit the clock pulses from generator CL2 to pass therethrough. It is to be noted that the clock pulses as generated from generator CL2 has a frequency which is several tens times higher than the frequency of the pulse as produced from the Q terminal of flip-flop FF6. OR gate OR3 produces a signal of logic "1" when either AND gate AN4 or AN5 produces a signal of logic "1" and applies it to shift registers CBn as a clock pulse $\Phi 2$. An inverter IN2 connected to OR gate OR3 produces a clock pulse, having a phase opposite to the clock pulse produced from OR gate OR3, and applies it to shift registers CAn as a clock pulse $\Phi 1$ and also to an image signal producing circuit VS. It is to be noted that the signal of logic "1" as produced from terminal T22 of microcomputer 30 is for effecting the initialize of the image sensor.

In FIG. 4, examples of the brightness detecting circuit 40 and the digital signal generator 20 are shown. In the drawing, reference characters T10, T11 and T12 designate terminals for receiving signals AGCOS, DOS and OS, respectively. Applied to terminal T13 is the shift pulse SH from D flip-flop DF2, and to terminals T15 and T16 are sampling start pulse and sampling stop pulse from microcomputer 30 through data bus DB1 in a manner which will be described later. Terminal T14 is connected to one input of AND gate AN2 shown in FIG. 3.

Brightness detecting circuit 40 has comparators AC1, AC2, AC3 and AC4 for detecting the rate of decrease of the voltage signal AGCOS from the brightness monitor circuit MC after the disappearance of the integration clear pulse ICG. The inverting inputs of the comparators AC1-AC4 are connected through a buffer B1 to terminal T10. The non-inverting inputs of the comparators AC1-AC4 are connected, respectively, to a junction J4 between a resistor R1 and a constant current source I1, a junction J5 between a resistor R2 and a constant current source I2, a junction J6 between a resistor R3 and a constant current source I3, and a junction J7 between a resistor R4 and a constant current source I4. Resistors R1, R2, R3 and R4 are connected through buffer B2 to terminal T11. By the above arrangement, a voltage equal to the reference voltage DOS from the reference voltage generator RS subtracted by a voltage drop across resistor R1 will be produced at junction J4. Similarly, a voltage equal to the reference voltage DOS subtracted by a voltage drop across resistor R2 will be produced at junction J5; a voltage equal to the reference voltage DOS subtracted by a voltage drop across resistor R3 will be produced at junction J6; and a voltage equal to the reference voltage DOS subtracted by a voltage drop across resistor R4 will be produced at junction J7. By selecting appropriate resistances for registers R1, R2, R3 and R4 and appropriate currents from constant current sources I1, I2, I3 and I4, the gradual decrease of the voltage AGCOS will result in the sequential state change, from "0" producing state to "1" producing state, of comparators AC1, AC2, AC3 and AC4. The outputs of comparators AC1, AC2 and AC3 are connected to D terminals of D flip-flops DF3, DF4 and DF5 having their CP terminals connected to the Q terminal of D flip-flop DF2 for receiving the shift pulse. Upon receipt of the shift pulse, D flip-flops DF3, DF4 and DF5 shifts the signals applied to the D terminals from comparators AC1, AC2 and AC3 to the Q terminals and, at the same time, produces opposite signals from the $\bar{Q}$ terminals. AND gate AN6 has one input connected to the Q terminal of D flip-flops DF3 and the other input connected to the $\bar{Q}$ terminal of D flip-flop D4. AND gate AN7 has one input connected to the Q terminal of D flip-flop DF4 and the other input connected to the $\bar{Q}$ terminal of D flip-flop DF5. The outputs b and c from AND gates AN6 and AN7, the $\bar{Q}$ output from a D flip-flop DF3, the Q output d from flip-flop DF5 and the output e from comparator AC4 are the outputs from the brightness detecting circuit 40 which carry information on the brightness level as detected by the monitor photodiode MP.

The other circuits shown in FIG. 4 define circuit 20 shown in FIG. 3. A reference number 22 designates a subtractor for producing a difference signal V1 which represents a difference between the voltage signal VOS as applied through terminal T12 and buffer B3 from the image signal producer VS and the voltage signal DOS as applied through terminal T11 and buffer B2 from the reference voltage generator RS. A reference number 24 is a peak detector for detecting and holding the peak value V2 (peak value in the negative direction) of the accumulated charges obtained from the photoelectric converting elements EAn covered completely with an aluminum mask (that is, not including the elements under the opposite ends of the aluminum mask). The signal V2 will be used for compensation for the dark output signal. Terminals T15 and T16 are provided for receiving the sampling start and sampling stop pulses from microcomputer 30 through data bus DB1 so as to determine the sampling period in the peak detector 24.

A reference number 26 designates a gain controllable differential amplifier for amplifying the difference between signals V1 and V2 as obtained from circuits 22 and 24. The gain (mu-factor) of the operational amplifier OP is determined by the signals a, b, c and d obtained from the brightness detector 40. The operational amplifier OP has two inputs f and g which are connected through input resistors R5 and R6 to circuits 22 and 24, respectively. Resistors R7-R14 are provided for selectively setting the gain of operational amplifier OP. The resistance of the resistors are so selected that resistors R5, R6, R7, R8, R11 and R12 have resistance r, resistors R9 and R13 have resistance 2r and resistors R10 and R14 have resistance 4r. Analog switches AS-1-AS8 are provided in which analog switches AS-1-AS4 are coupled to registers R10, R9, R8 and R7, respectively, for selectively determining the feedback resistance value of the operational amplifier OP in accordance with the signals obtained from the outputs a, b, c and d, and in which analog switches AS5-AS8 are coupled to resistors R14, R13, R12 and R11, respectively, for selectively determining the bias resistance value of the operational amplifier OP. Accordingly, the output voltage Vout of the operational amplifier OP can be expressed as follows.

$$Vout = E + (V2 - V1) \times A$$

wherein A is the gain A of the operational amplifier OP and E is a constant voltage. The output voltage Vout is applied to an A/D (analog-to-digital) converter ADC. The constant voltage E is set at an appropriate level in consideration of the dynamic range of the A/D converter ADC. The signals produced from the A/D converter ADC are applied through data bus DB1 to microcomputer 30 for being used to detect the focusing condition of the objective lens. In this manner, the amplifier circuit 26 changes its gain in accordance with the output signal from the brightness detecting circuit 40 and produces voltage signals which are appropriate for being processed in the A/D converter ADC and, therefore, it is possible to control the focusing condition with a wide range of brightness change.

Referring again to FIG. 3, microcomputer 30 has a terminal T17 from which the integration clear pulse ICG is produced. Also, from terminal T19 of the microcomputer 30, a signal of logic "1" is produced for permitting the generation of the shift pulse, and a signal of logic "0" is produced for prohibiting the generation of the shift pulse during the transfer of the accumulated charges from the photoelectric converting elements EAn to charge shift registers CAn. From terminal T18 of the microcomputer 30, a signal of logic "1" is produced when no specific pulse is generated from the terminal T14 of the brightness detector 40 during a predetermined time from a time t0 at which the integration clear pulse ICG disappeared. The integration clear pulse as produced from terminal T17 is applied through terminal T6 to the integration clear gate ICG of the image sensor 1, and is also applied to flip-flop FF0 which thereupon produces a signal of logic "1" from its Q terminal thereby enabling AND gate AN1. Under this condition, if terminal T19 also produces a signal of logic "1", AND gate AN2 is also enabled. When the object is brighter than a certain level, terminal T14 of brightness detecting circuit 40 produces a signal of logic "1" along lines e at moment t2 which is before counting a predetermined period (100 ms) from time t0 when the integration clear pulse disappeared. When the object is less brighter than the certain level, terminal T18 of the microcomputer 30 produces a signal of logic "1" at time t3 that is when the predetermined period (100 ms) has been counted from time t0. Accordingly, when the object is bright, AND gate AN2 produces a signal of logic "1" at time t2, and when the object is dark, AND gate AN1 produces a signal of logic "1" at time t3. OR gate OR1 transmits the signal of logic "1" either from AND gate AN1 or AN2 and applies it to D input of D flip-flop DF1. Clock terminal CK of the D flip-flop DF1 receives standard clock pulses (one cycle period is 2 microseconds) from clock pulse generator CL1, so that D flip-flop DF1 produces from its Q terminal a signal of logic "1" in response to the trailing edge of the standard clock pulse applied immediately after the input of the signal of logic "1" to its D terminal, thereby resetting flip-flop FF0. Thus, AND gates AN1 and AN2 are disabled and, at the same time, flip-flops FF1-FF6 provided in transfer clock pulse generators 10 are reset, thereby producing signals of logic "0" from Q terminals Q1-Q6 of flip-flops FF1-FF6. Then, after the AND gates AN1 and AN2 are disabled, the Q terminal of flip-flop DF1 produces a signal of "0" in response to the trailing edge of the next standard clock pulse. As a result, flip-flop DF1 produces from its Q terminal a positive going pulse having a pulse duration of 2 microseconds. This pulse is used as a reset pulse.

Similarly, D flip-flop DF2 produces a signal of logic "1" from its Q terminal in response to the trailing edge of a standard clock pulse produced from clock generator CL1 immediately after the generation of the signal of logic "1" from the Q terminal of D flip-flop DF1, and thereafter, it produces a signal of logic "0" from its Q terminal in response to the trailing edge of a standard clock pulse immediately after the generation of the signal of logic "0" from the Q terminal of D flip-flop DF1. Therefore, from the Q terminal of D flip-flop DF2, a positive going pulse having a pulse duration of 2 microseconds and synchronized with the trailing edge of the reset pulse is produced. This pulse is used as a shift pulse SH. The shift pulse is applied to terminal T21 of the microcomputer 30 and, at the same time, through terminal T7 to shift gates SGn of image sensor 1.

The operation of the above described circuit will now be described with reference to FIG. 2 showing a time chart of shift pulse generation under the condition aiming a bright object. By the ICG pulse, a capacitor provided in circuit MC is fully charged by power source VLD, and a voltage signal AGCOS which is in relation to VLD is produced from terminal T10. When the ICG pulse disappears, charge accumulation takes place at the rate relative to the brightness of the object to gradually decrease the voltage signal AGCOS. Then, when the voltage signal AGCOS is decreased to a predetermined level $V = R4 \times I4$, at time t2, the output T14 of comparator AC4 inverts from "0" to "1". It is preferable to end the charge accumulation at the time when the output T14 is inverted, but according to the prior art circuit of FIG. 3, the charge accumulation ends with a delay being 4 microseconds at minimum and 6 microseconds at maximum, as explained below. In response to the inversion of the output T14, flip-flop DF1 changes its state, with a maximum delay of 2 microseconds, and after another delay of 2 microseconds, flop-flop DF2 produces a shift pulse SH. By the trailing edge of the shift pulse SH, charges are transferred from charge accumulation elements FAn to registers CAn, thereby actually ending the charge accumulation. Since the shift pulse SH is also formed by using the standard clock pulse having pulse duration of 2 microseconds, the charge accumulation (light integration) in the charge accumulation elements FAn always accompanies overtime charge accumulation ranging from 4 microseconds to 6 microseconds. In other words, the charge accumulation actually ends after a delay of 4 microseconds at the minimum and 6 microseconds at the maximum from the inversion of the signal at terminal T14 from "0" to "1". This will result in undesirable increase of the average output of the photoelectric converting elements and, therefore, the signals to be processed in the later stage will be saturated if the target object has a high brightness. Accordingly, the overtime charge accumulation due to the delay in the ending of charge accumulation from the inversion of the signal at terminal T14 itself is a drawback of the prior art driving circuit of FIG. 3.

SUMMARY OF THE INVENTION

It is, accordingly, an object of the present invention to provide an improved image sensor or image sensing system with a plurality of charge accumulation type photosensor arrays, which is free from one or more of the above described problems.

To accomplish the object, an image sensor or image sensing system of the present invention is provided with a plurality of arrays of charge accumulation type sensor elements, each arranged to receive an object image and capable of accumulating an electrical charge at a speed dependent on the intensity of light impinging thereon, and a plurality of monitor sensor means provided adjacent each of the arrays for producing a monitor output signal varying at a speed dependent on the brightness of the image impinging on the corresponding array. A plurality of charge accumulation time control means are arranged adjacent each of the arrays to control the charge accumulation time period in the corresponding array in accordance with the brightness of the image on that array, respectively. Thus, the plurality of charge accumulation time control means produce a charge accumulation time control signal at a moment when the monitor output signal reaches a predetermined reference level, and the charge accumulation at the respective arrays is terminated in response to the charge accumulation control signal without causing overtime charge accumulation.

Additionally, the image sensor or image sensing system of the present invention is provided with a plurality of buffer memory means provided for each of the arrays for temporarily storing the accumulated charges shifted from the sensor elements of the corresponding array in response to the charge accumulation time control signal from the corresponding charge accumulation time control means. The generation of the charge accumulation time control means by all of the charge accumulation time control means is detected by charge accumulation and detecting means, which in turn produces a shift signal causing the accumulated charges stored in the plurality of the buffer memory means to be shifted parallely to shift register means, so that signals representing the amounts of the accumulated charges are sequentially outputted from the shift register means. Due to the temporary storage of the accumulated charges shifted from the sensor elements of the respective arrays, no overtime charge accumulation takes place at the respective arrays even when the brightness of the image on the array differs from that of the image on another array, and also it is made possible for the shift register means to sequentially output the signals representing the amounts of the accumulated charges.

Furthermore, the image sensor or image sensing means of the present invention is provided with covering means which is arranged in each of the arrays for optically covering a predetermined number of sensor elements thereof located at a leading end portion of the array, so that charges are accumulated in the covered sensor elements under a dark condition. The charges accumulated in the covered sensor elements are outputted as dark current signals from the shift register means in advance of the outputting of the signals representing the charges accumulated in the remaining sensor elements uncovered to receive impinging light. This makes it possible to correct the latter signals by the dark current signals for each of the arrays, and therefore the dark current which is inherent and characteristic to each of the arrays can be eliminated simply from all the signals sequentially outputted from the shift register means.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which:

FIG. 9a is a chart showing timed relationship of the signals for driving the image sensor of FIG. 6;

FIG. 14 is a perspective view of the optical arrangement, of a two directional focus detecting system, in which an image sensor, according to another embodiment of the present invention, having a plurality of charge accumulation type photosensor arrays is employed;

FIG. 15 is an exploded perspective view of the optical arrangement of FIG. 14, assembled as one unit;

FIGS. 22a and 22b taken together as shown in FIG. 22 show a flow chart of an operation of an AF microcomputer for driving the objective lens under the first operation mode control;

FIGS. 23a and 23b taken together as shown in FIG. 23 show a flow chart of an operation of the AF microcomputer for driving the objective lens under the second operation mode; and FIGS. 24a, 24b and 24c taken together as shown in FIG. 24 show a flow chart of an operation of the AF microcomputer for driving the objective lens under the third operation mode.

DESCRIPTION OF THE PREFERRED EMBODIMENTS

Figure 1:
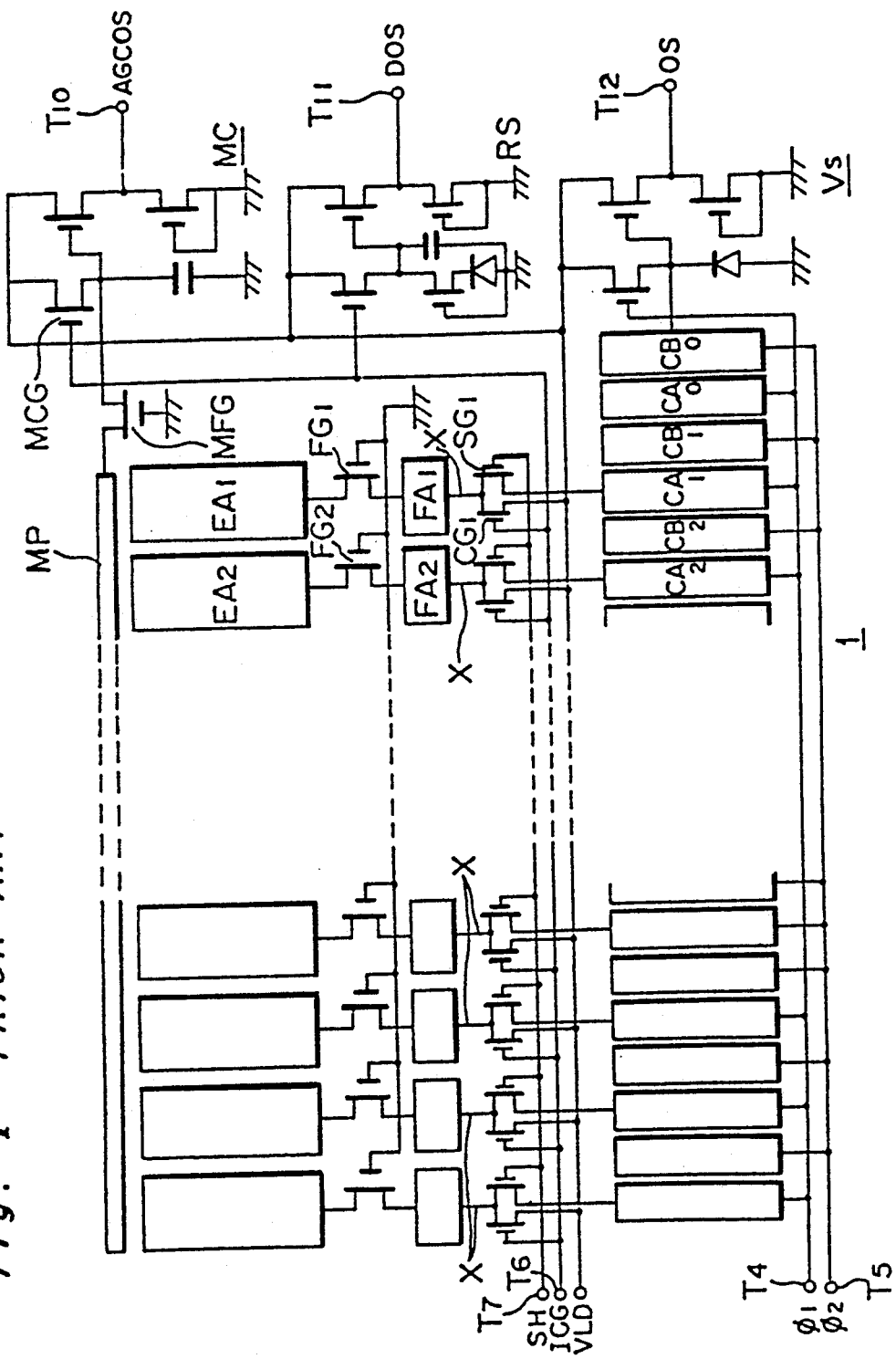
FIG. 1 is a circuit diagram of an image sensor according to the prior art having a single charge accumulation type photosensor array (already referred to)
Figure 2:
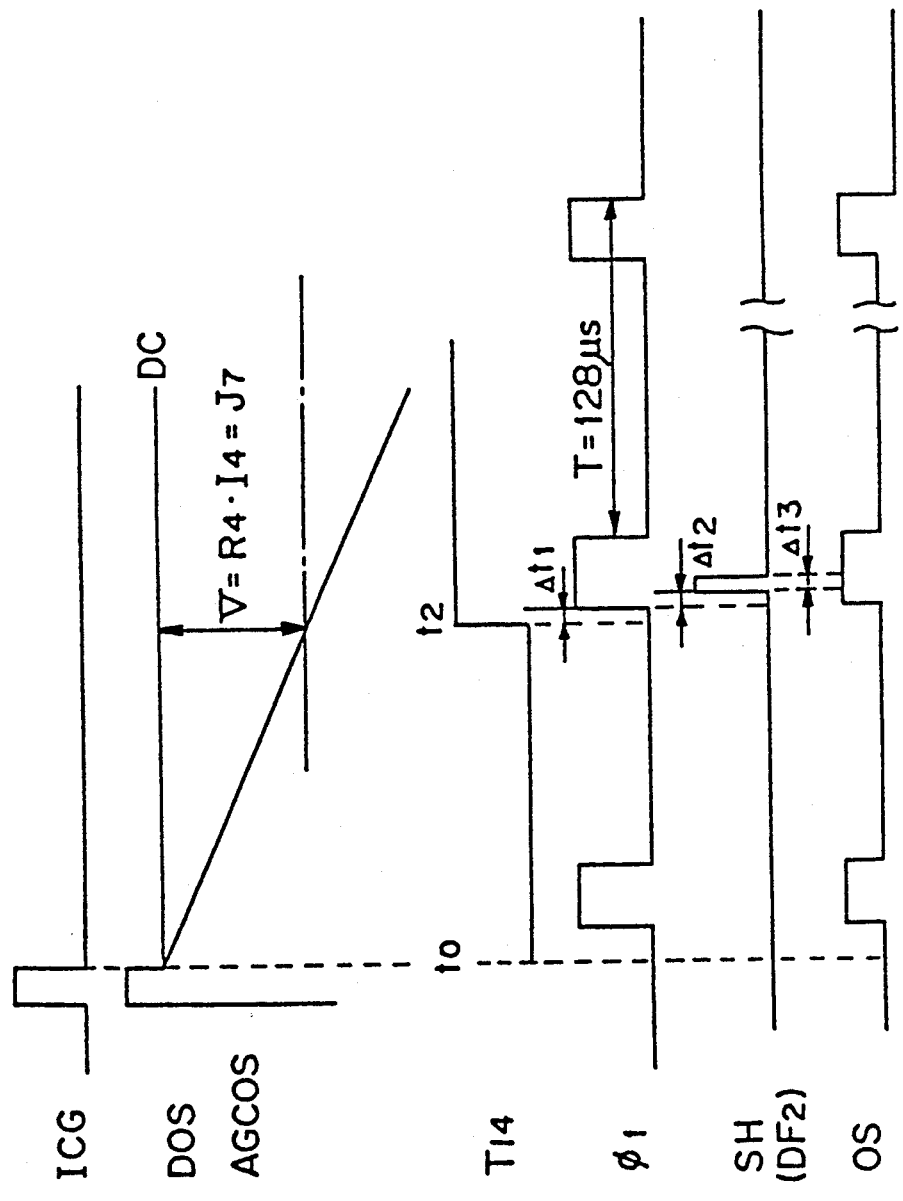
FIG. 2 is a chart showing timed relationship of the signals for driving the image sensor of FIG. 1.
Figure 5:
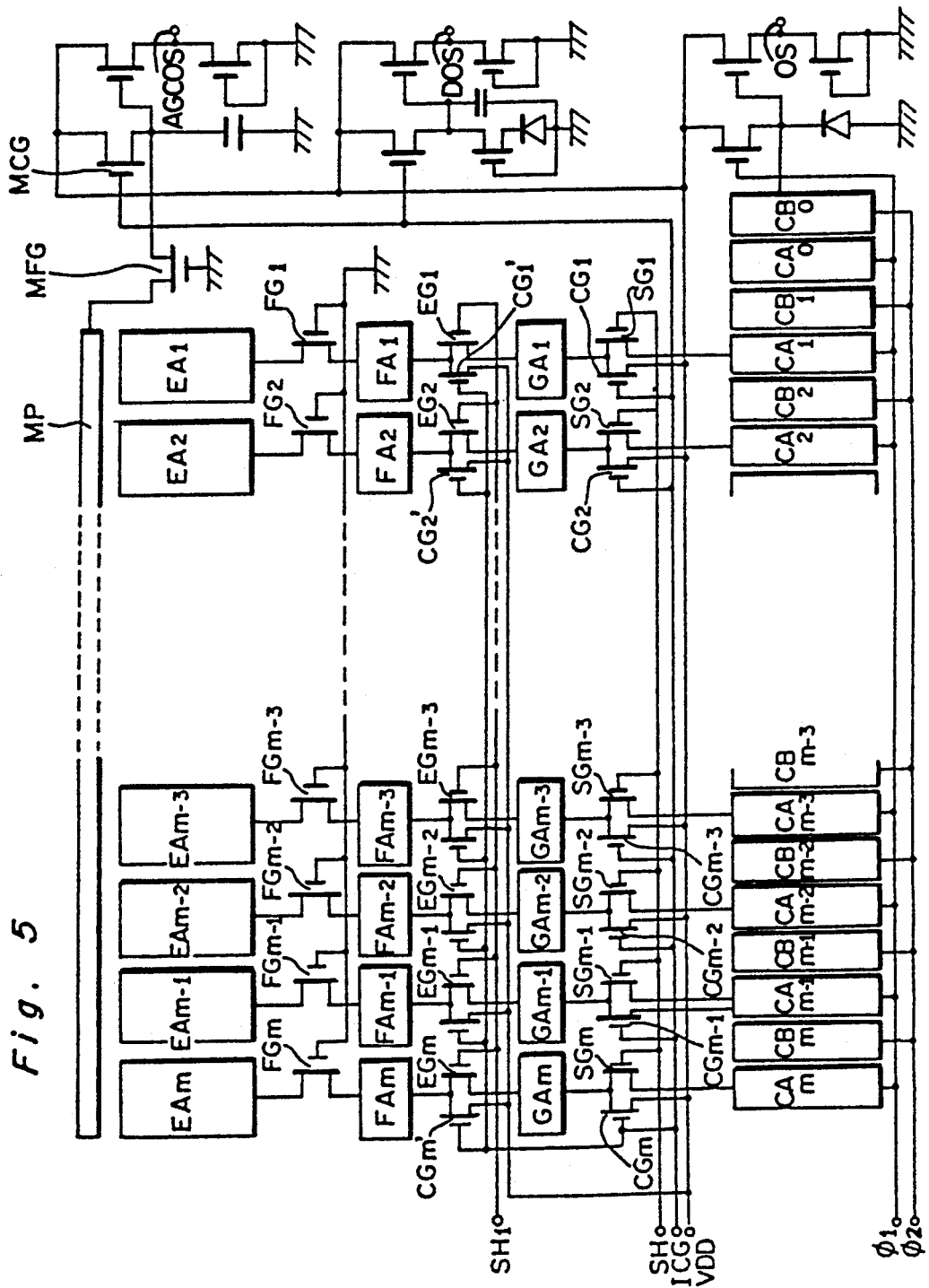
FIG. 5 is a circuit diagram of an image sensor which is an improvement of the prior art image sensor of FIG. 1.

Referring to FIG. 5, a image sensor 1 which is an improvement of the image sensor of FIG. 1 is shown. When it is compared with the image sensor of FIG. 1, additional charge accumulation elements GAn (n=1, 2, 3, ..., m), and gates EGn and CGn' are inserted in lines X of FIG. 1. Therefore, regardless of the period of the transfer clocks, the charges generated by the photoelectric converting elements EAn and stored in the charge accumulation elements FAn can be shifted to the second charge accumulation elements GAn by the operation of gates EGn which are turned on in response to a shift pulse SH1. The shift of the charges to the second charge accumulation elements GAn will result in the completion of the integration.

In the image sensor shown in FIG. 5, clear gates CGn for the second charge accumulation elements GAn are provided, but they can be eliminated. The clear gates CGn are necessary only when it is required to restart the integration after the shift of the charges from charge accumulation elements FAn to GAn. In this case, the charges in the charge accumulation elements GAn are not necessary and, therefore, they are cleared by the turn on of the clear gates CGn. Whether or not such clear gates CGn are necessary is dependent on the autofocus sequence program using the image sensor.

Figure 3:
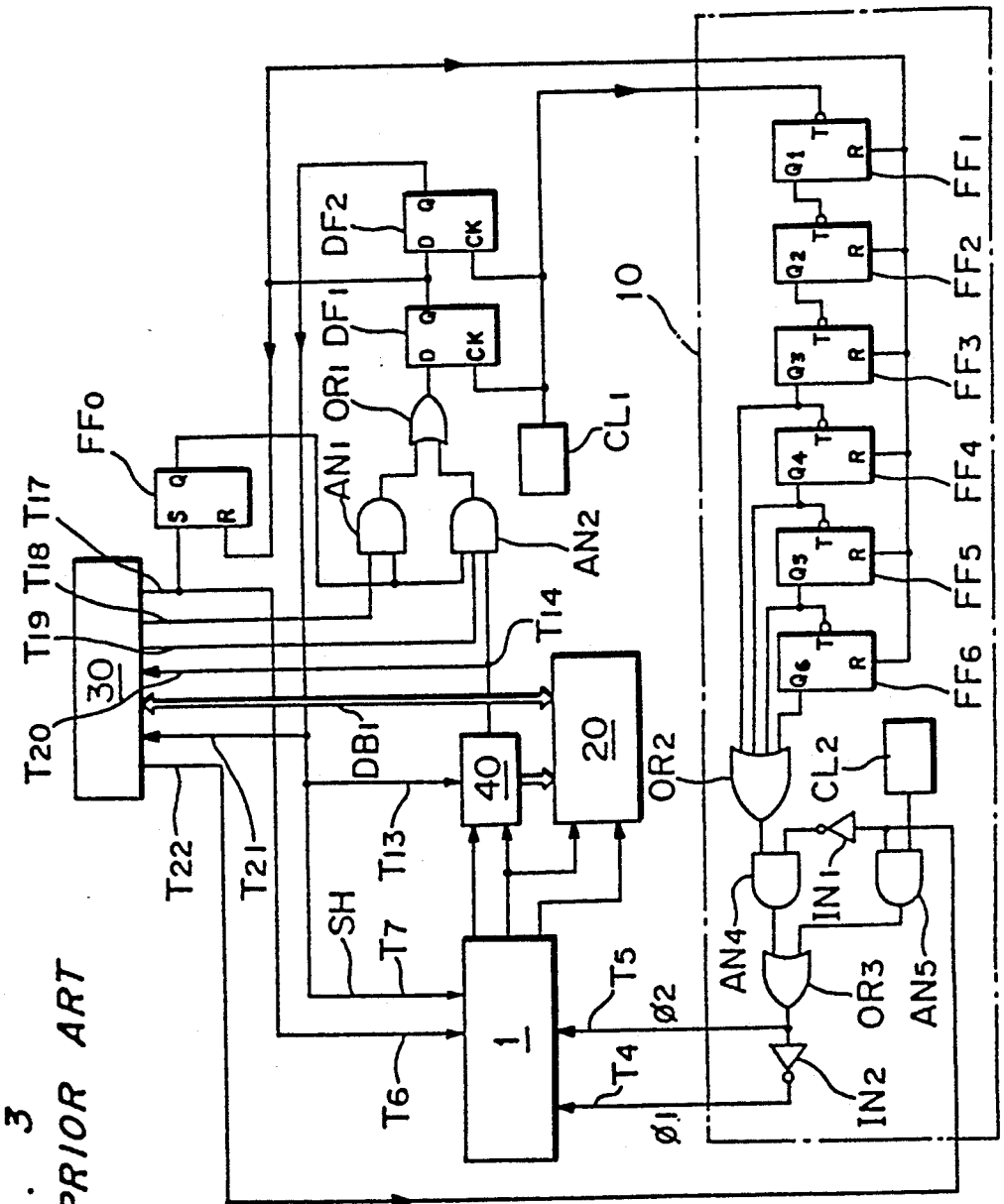
FIG. 3 is a circuit diagram of a driving circuit for driving the image sensor of FIG. 1.
Figure 6:
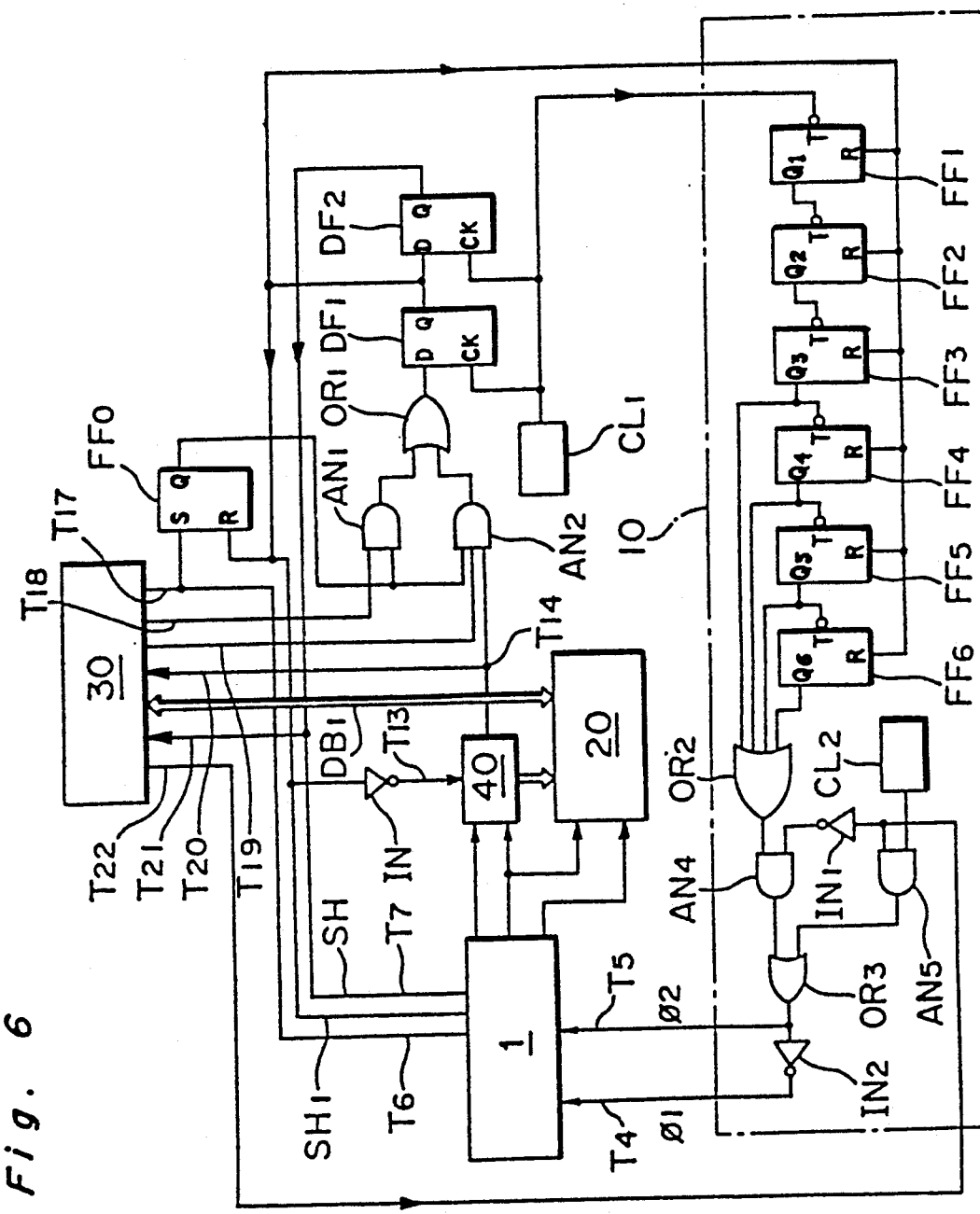
FIG. 6 is a circuit diagram of a driving circuit for driving the image sensor of FIG. 5.
Figure 7:
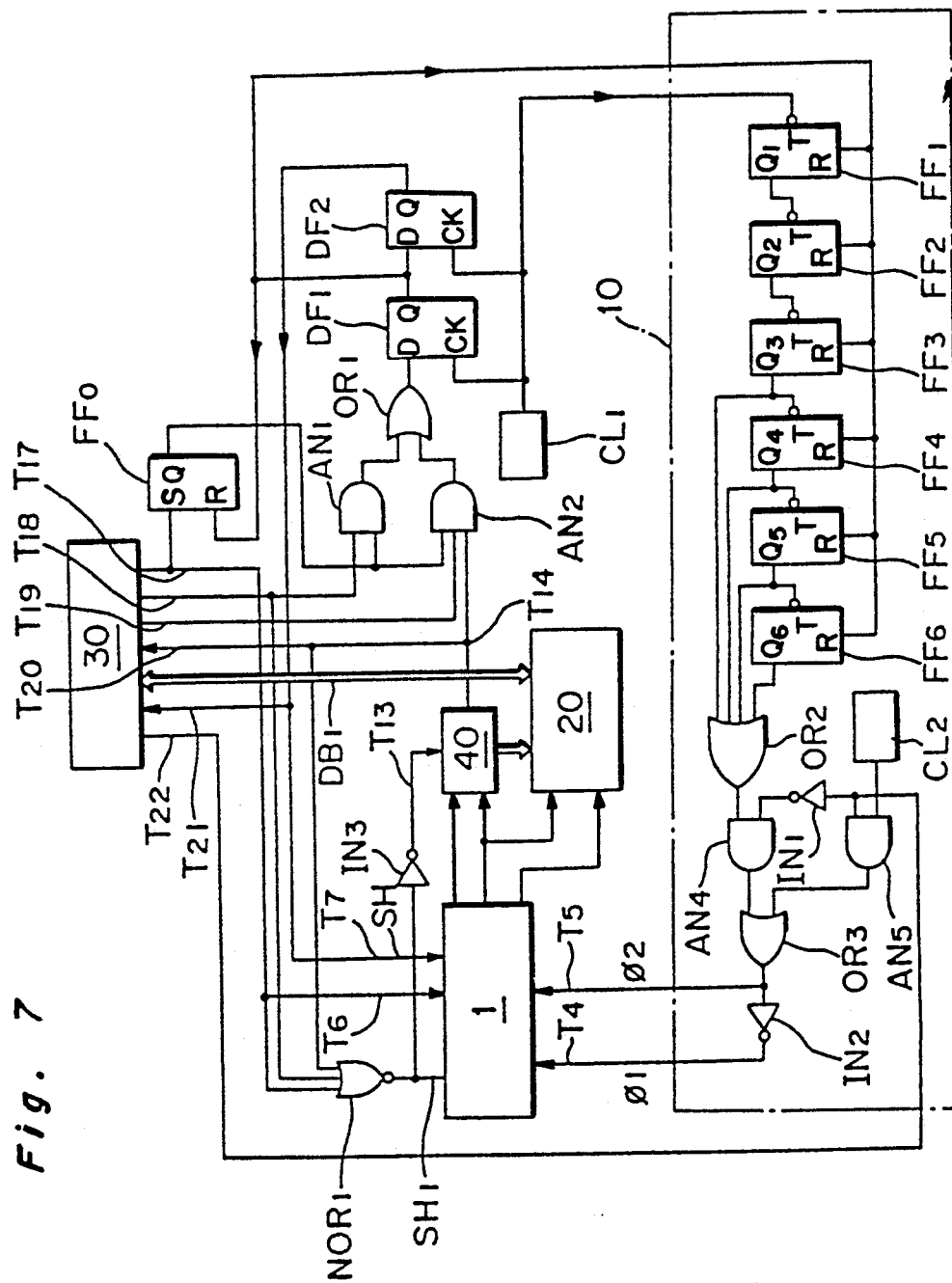
FIG. 7 is a circuit diagram of a driving circuit similar to that of FIG. 6, but particularly showing a modification thereof.
Figure 8:
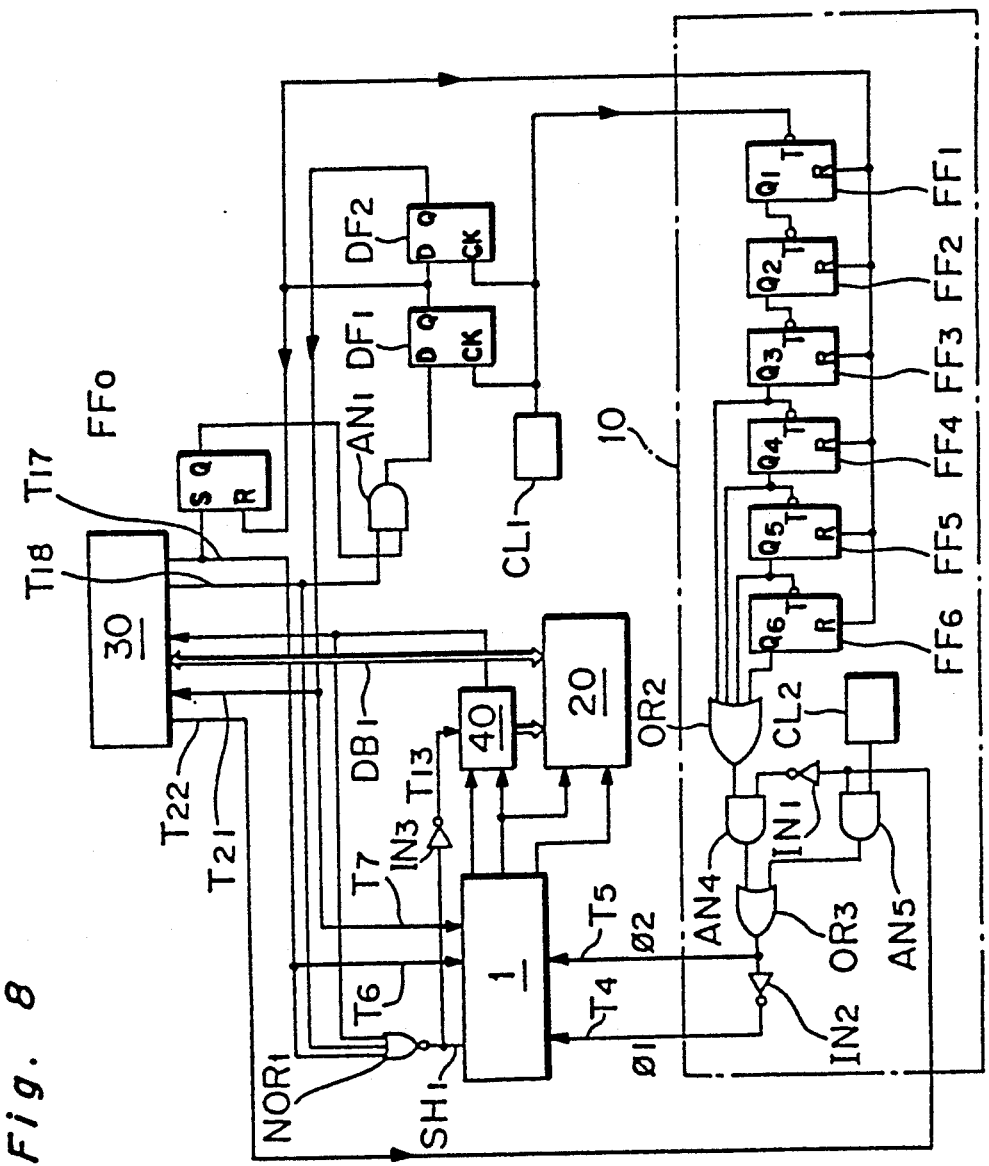
FIG. 8 is a circuit diagram of a driving circuit similar to that of FIG. 6, but particularly showing another modification thereof.
Figure 9B:
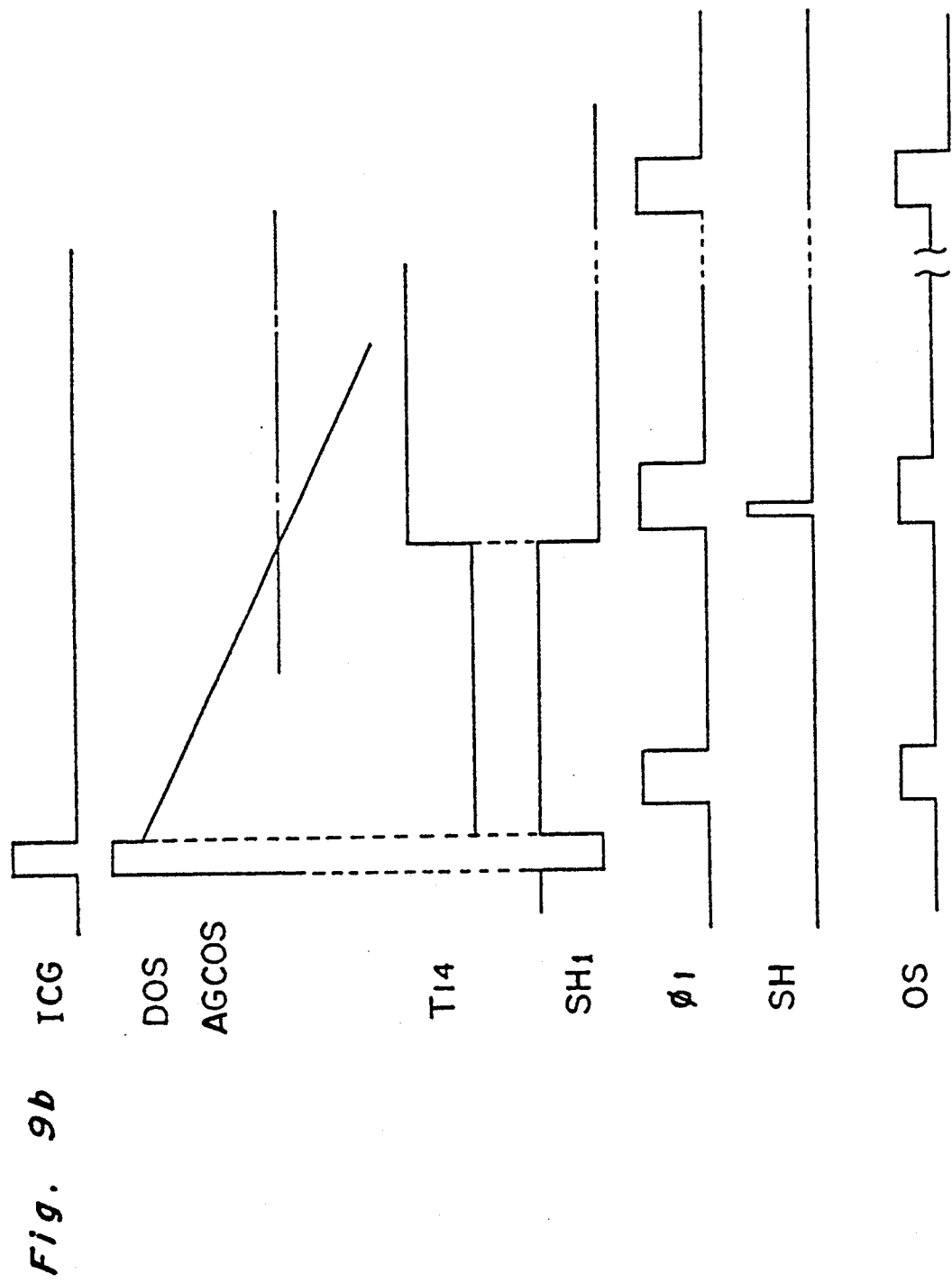
FIG. 9b is a chart showing timed relationship of the signals for driving the image sensor of FIG. 7.

In FIGS. 6, 7 and 8, three different circuits for driving the image sensor of FIG. 5 are shown, and in FIGS. 9a and 9b, time charts of operations of the circuits are shown. The circuits shown in FIGS. 6, 7 and 8, are similar to the circuit shown in FIG. 3, but are different in the point that the circuits of FIGS. 6, 7 and 8 produce a shift pulse SH1 which is applied to image sensor 1 shown in FIG. 5 so as to enable the gates EGn to permit transmittal of the accumulated charges from charge accumulation elements FAn to charge accumulation elements GAn.

Referring to FIG. 6, a pulse produced from the Q terminal of flip-flop DF1 is used as the shift pulse SH1 which is applied to image sensor 1. Therefore, it takes at maximum 2 microseconds between the time when the output T14 is inverted and the time when flip-flop DF1 produces a pulse, i.e., shift pulse SH1 having a pulse duration of 2 microseconds, from it Q terminal. In image sensor 1, the integration ends in response to the trailing edge of the shift pulse SH1. Therefore, according to the circuit of FIG. 6, the integration actually ends with an overtime between 2 microseconds and 4 microseconds from the time when the output T14 is inverted. When compared with the circuit of FIG. 3, it is understood that the overtime is shortened by 2 microseconds.

Also, according to the circuit of FIG. 6, the latch signal applied along terminal T13 for controlling the gain of the gain controllable amplifier in circuit 40 is prepared by the same signal SH1 but in an inverted form. Thus, the gain control is effected by the leading edge of the latch signal, that is, by the amount of the monitor output at the time when the integration is completed. The operation of the circuit of FIG. 6 is shown in FIG. 9a.

Referring to FIG. 7, the circuit is so arranged as to control the image sensor 1 such that MOS transition gates EGn turn on at the beginning of the charge accumulation and turn off at the end of the charge accumulation. Accordingly, during the charge accumulation, the charges as produced from the photoelectric converting elements EAn are transmitted through charge accumulation elements FAn and are accumulated in charge accumulation elements GAn.

In FIG. 7, a NOR gate NOR1 is provided which receives an integration start signal ICG from terminal T17, a compulsory shift signal from terminal T18 of microcomputer 30, and a comparator output T14 from a brightness detecting circuit 40. The output of NOR gate NOR1 is provided to the image sensor 1 at gate for receiving the shift pulse SH1, and also through an inverter IN3 to brightness detecting circuit 40 as a latch signal.

In operation, by the integration start signal ICG pulse, NOR gate NOR1 produces a LOW level signal. At this time, the output AGCOS of the monitor circuit of the image sensor holds a voltage having a level equal to the reference voltage, so that circuit 40 produces a LOW level signal from its terminal T14. Also, the compulsory shift signal from terminal T18 of microcomputer 30 is maintained at a LOW level. Then, when the integration start signal ICG pulse disappears, NOR gate NOR1 produces a HIGH level signal, thereby turning the MOS transistor gates EGn on to enable the charge accumulation in the second charge accumulation elements GAn.

In the case when the object has a high brightness, the voltage level of the output signal AGCOS from the monitor circuit decreases so fast that the voltage AGCOS is dropped to a predetermined level before a predetermined time is counted. When the voltage AGCOS is dropped to the predetermined level, terminal T14 from circuit 40 inverts from low to high. This signal from terminal T14 is applied, at real time, to NOR gate NOR 1 and further to image sensor 1 as output SH1. Thus, the MOS transistors EGn are turned off. Therefore, in response to the inversion of the signal from terminal T14, the integration ends.

On the other hand, when the object has a low brightness, the signal from terminal T14 will not invert within the predetermined time. In this case, the compulsory shift pulse from terminal T18 of microcomputer 30 is applied to NOR gate NOR1 and to image sensor 1 as output SH1. In this case, the integration ends in response to the generation of the compulsory shift pulse from terminal T18.

Simultaneously with the generation of the shift pulse SH1, the signal from terminal T14 or T18 enables, respectively, AND gate AN2 or AN1, so as to produce a HIGH level signal from OR gate OR1, resulting in the generation of a HIGH level signals sequentially from the Q terminals of flip-flops DF1 and DF2. When the Q terminal of flip-flop DF2 produces a HIGH level signal, which is a shift pulse SH, the charges accumulated in the second charge accumulation elements GAn are transferred to the cells of the corresponding shift registers CAn. Thereafter, the image signal is sequentially outputted from the shift registers CAn in response to the pulses Φ1 and Φ2 (FIG. 9b).

In the case when microcomputer 30 is carrying out some job, it may happen that microcomputer 30 misses catch the inversion of the signal from terminal T14 so that microcomputer 30 will not be ready to receive the image signal sequentially transmitted by the pulses Φ1 and Φ2. In order to properly receive the image signal even when the microcomputer is busy doing some job, one way is to revise the program of the microcomputer at the sacrifice of a program for some job. To solve the above problem without sacrificing the program for any job, an improved arrangement is proposed, in which the charges accumulated in the second charge accumulation elements GAn are maintained therein until a READY signal is produced from microcomputer 30. When the READY signal is produced, charges are transferred from the second charge accumulation elements GAn to CCD registers CAn. The improved arrangement is shown in FIG. 8.

Referring to FIG. 8, the shift pulse SH at terminal T7 is produced only when terminal T18 of microcomputer 30 produces a HIGH level signal. Therefore, when the brightness of the object is high to complete the integration in response to the inversion of the signal from terminal T14, the charges accumulated in charge accumulation elements GAn are maintained therein until a pulse is applied to terminal T7. In the mean time, microcomputer 30 detects the inversion of the signal at terminal T14, and thereafter, produces a HIGH level signal from terminal T18 when it is ready to receive the image data.

By the above arrangement, it is possible to control the time when to produce the image signal from CCD register CAn. This is particularly suitable when the object has a high brightness.

The image sensor shown in FIG. 5 has first charge accumulation elements FAn for accumulating charges generated by photoelectric converting elements EAn, second charge accumulation elements GAn for receiving the charges accumulated in the first charge accumulation elements, charge shift registers CAn and CBn and a monitor photodiode MP for monitoring the averaged brightness of the target object whose image is formed on the photoelectric converting elements EAn. When the quantity of light received by the monitor photodiode MP reaches a predetermined level, the charge accumulation at the first charge accumulation elements FAn ends, and thereafter, the charges in the first charge accumulation elements FAn are shifted to the second charge accumulation elements GAn, and then, further to the shift registers CAn and CBn. Therefore, it is not necessary to take a synchronization between the ending of the charge accumulation as effected in the first charge accumulation elements FAn and the clock pulses Φ1 and Φ2 for effecting the charge transfer in the shift registers. Thus, overtime charge accumulation in the first charge accumulation elements FAn can be minimized, even for objects having a high brightness, whereby a high quality image signal is obtained.

Next, the description is directed to an image sensing system according to an embodiment of the present invention, using a plurality of image sensors shown in FIG. 5 and applied to a multi-point focus detecting system.

Figure 10:
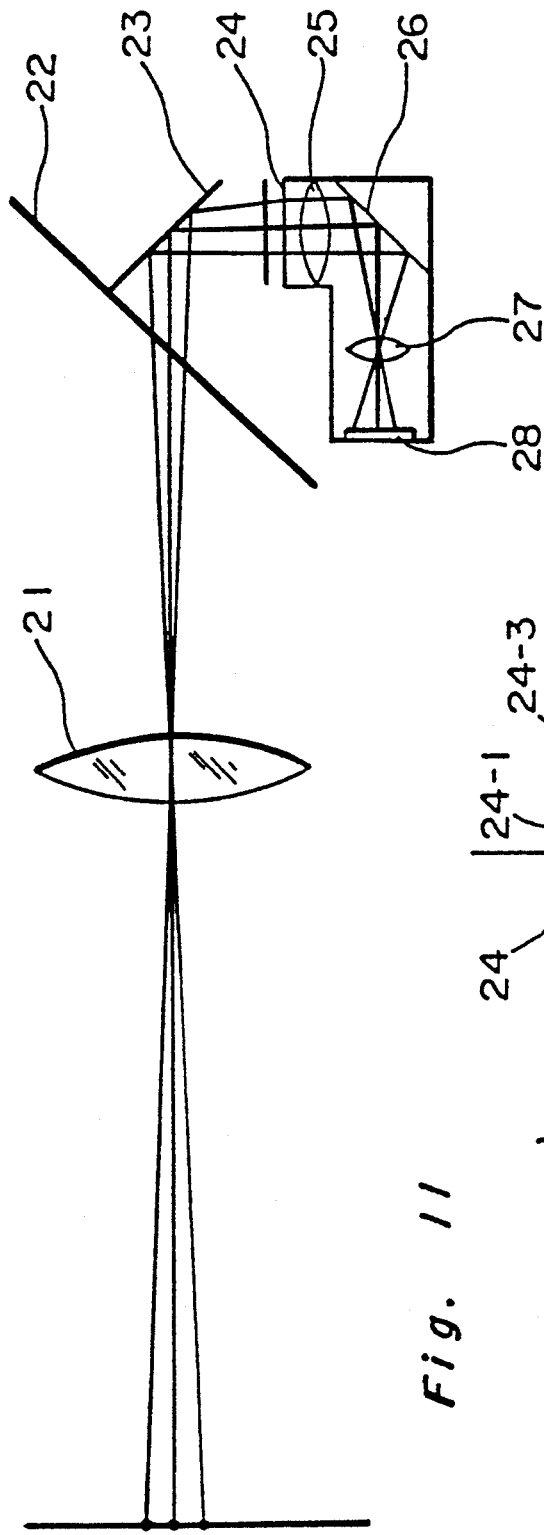
FIG. 10 is a diagram showing an optical arrangement of a multi-point focus detecting system, in which an image sensor, according to one embodiment of the present invention, having a plurality of charge accumulation type photosensor arrays is employed.

Referring to FIG. 10, an optical arrangement of the multi-point focus detecting system for use in a single reflex camera is shown. In the drawing, a reference number 21 designates an objective lens of the camera, 22 is a main mirror, 23 is a full reflection sub-mirror, 24 is a mask which will be described below in connection with FIG. 11, 25 is a condenser lens, 26 is a full reflection mirror, 27 is a pair of re-focusing or re-imaging lenses aligned side-by-side, and 28 is an image sensor.

Figure 11:
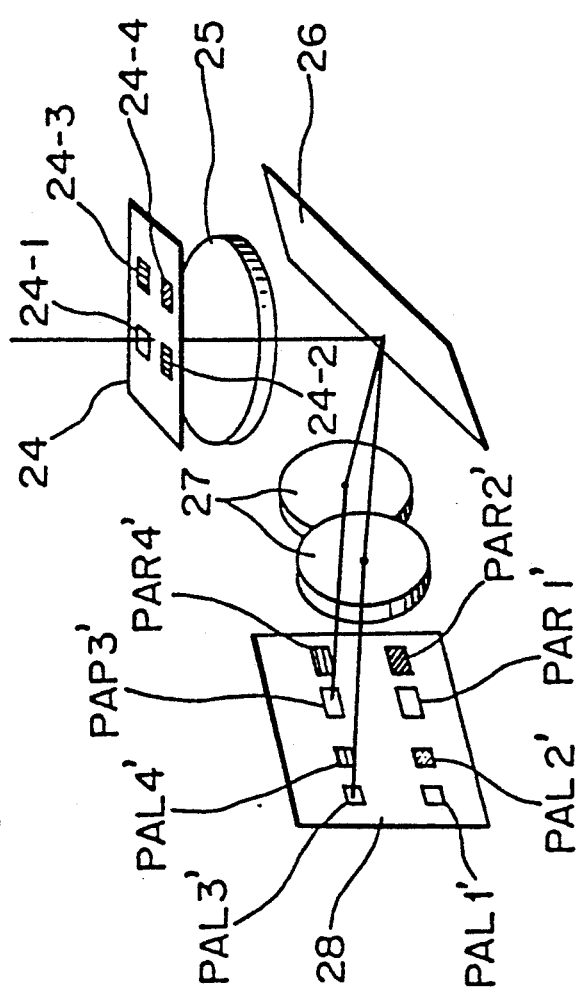
FIG. 11 is a perspective view of the optical arrangement of FIG. 10, particularly showing the light paths in detail.

As shown in FIG. 11, mask 24 has four light transparent portions 24-1, 24-2, 24-3 and 24-4 which are aligned in two rows and two columns, thereby dividing the light path into four zones. The light in the four zones passes through condenser lens 25, reflects at full reflection mirror 26, and further passes through re-focusing lenses 27 by which the light in each zone is divided into two paths, one for making a standard image and the other for making a reference image on the image sensor 28. Therefore, on the image sensor 28, four standard images PAL1', PAL2', PAL3' and PAL4' and four reference images PAR1', PAR2', PAR3' and PAR' are formed. The focus conditions for each zone is detected by the detection of a distance between the standard and reference images which are originated from the zone. In the case where the average brightness in one zone differs greatly with that in another zone, it is necessary to control the output signal to an appropriate level and to calculate the focus detection individually for each zone. When one image sensor is used for this purpose, it is necessary to control the integration time, and the gain of the amplifier for amplifying the sensor output separately for each zone. The sensor 28 and a driving circuit therefor which can accomplish the above necessity are shown in FIGS. 12 and 13, respectively.

Figure 12:
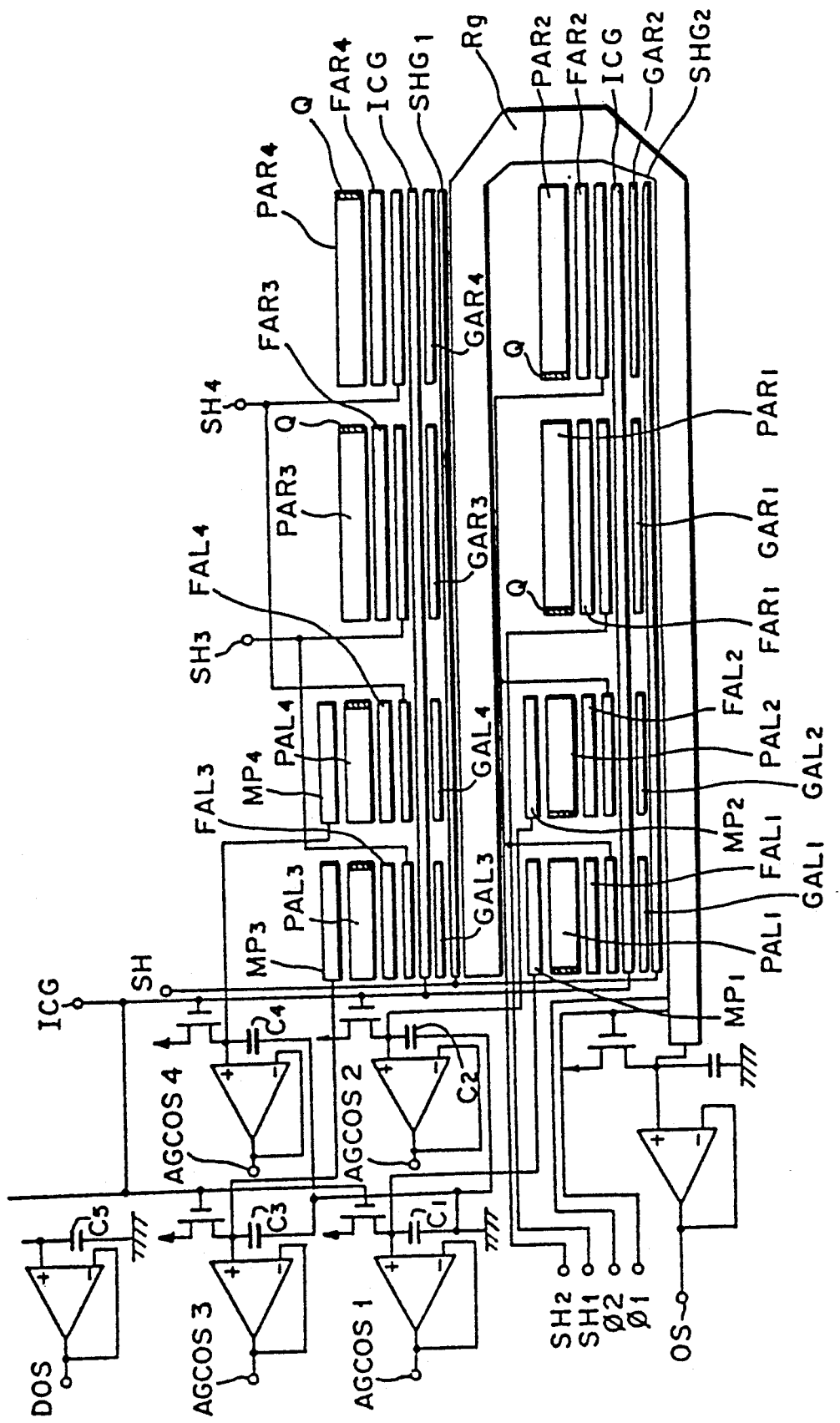
FIG. 12 is a diagrammatic view particularly showing the layout of the image sensor employed in the multi-point focus detecting system of FIG. 10.

Referring to FIG. 12, the description is now directed to the image sensor 28. In the drawing, reference characters PAL1, PAL2, PAL3 and PAL4 designate arrays of photoelectric converting elements for receiving standard images PAL1', PAl2', PAL3' and PAL', respectively, in four zones 24-1, 24-2, 24-3 and 24-4; reference characters PAR1, PAR2, PAR3 and PAR4 designate arrays of photoelectric converting elements for receiving reference images PAR1', PAR2', PAR3' and PAR4', respectively, in four zones 24-1, 24-2, 24-3 and 24-4; reference characters MP1, MP2, MP3 and MP4 designate monitor photodiodes for the four zones; reference characters FAL1, FAL2, FAL3 and FAL4 designate floating gates and charge accumulation element arrays for use in combination with photoelectric converting arrays PAL1, PAL2, PAL3 and PAL4, respectively; reference characters FAR1, FAR2, FAR3 and FAR4 designate floating gates and charge accumulation element arrays for use in combination with photoelectric converting arrays PAR1, PAR2, PAR3 and PAR4, respectively; reference characters SH1, SH2, SH3 and SH4 designate first shift gates for the four zones; reference characters GAL1, GAL2, GAL3 and GAL4 designate second charge accumulation element arrays; reference characters SHG1 and SHG2 designate second shift gates for the entire picture elements; and Rg is a CCD register having an OS output stage at one end thereof. The monitor photodiodes MP1, MP2, MP3 and MP4 are connected, respectively, to four different output stages to produce four different outputs AGCOS1, AGCOS2, AGCOS3 and AGCOS4. A reference voltage generator is provided to produce a reference voltage DOS which is used for the comparison with each of outputs AGCOS1, AGCOS2, AGCOS3 and AGCOS4 and output OS. In each of the photoelectric converting element arrays PAL1-PAL4 and PAR1-PAR4, a shaded portion Q at the leading end portion thereof indicates an aluminum mask covering several picture elements for producing a dark current for the correction use.

The above described arrangement for the multi-point focus detecting system is formed on a single substrate in a manner shown in FIG. 12. Each of the photoelectric converting element arrays PAL1-PAL4 and PAR1-PAR4 includes a plurality of photoelectric converting elements aligned in a row as shown in FIG. 5. Similarly, gates FAL1-FAL4 and FAR1-FAR4 and charge accumulation element arrays GAL1-GAL4 are arranged in a similar manner to the gates and charge accumulation elements FAn shown in FIG. 5.

Figure 4:
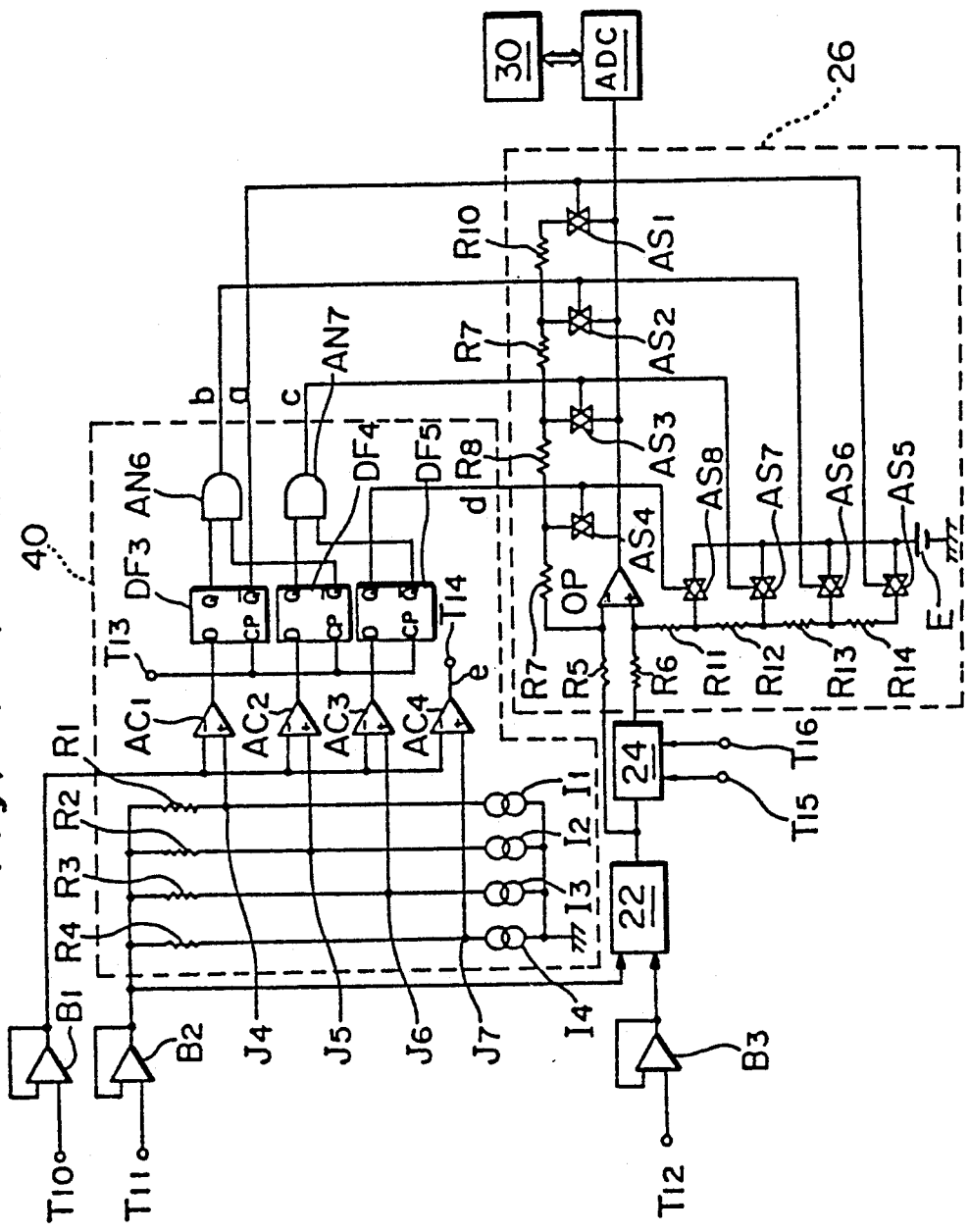
FIG. 4 is a circuit diagram for controlling the gain of an amplifier circuit employed in the circuit of FIG. 3.
Figure 13:
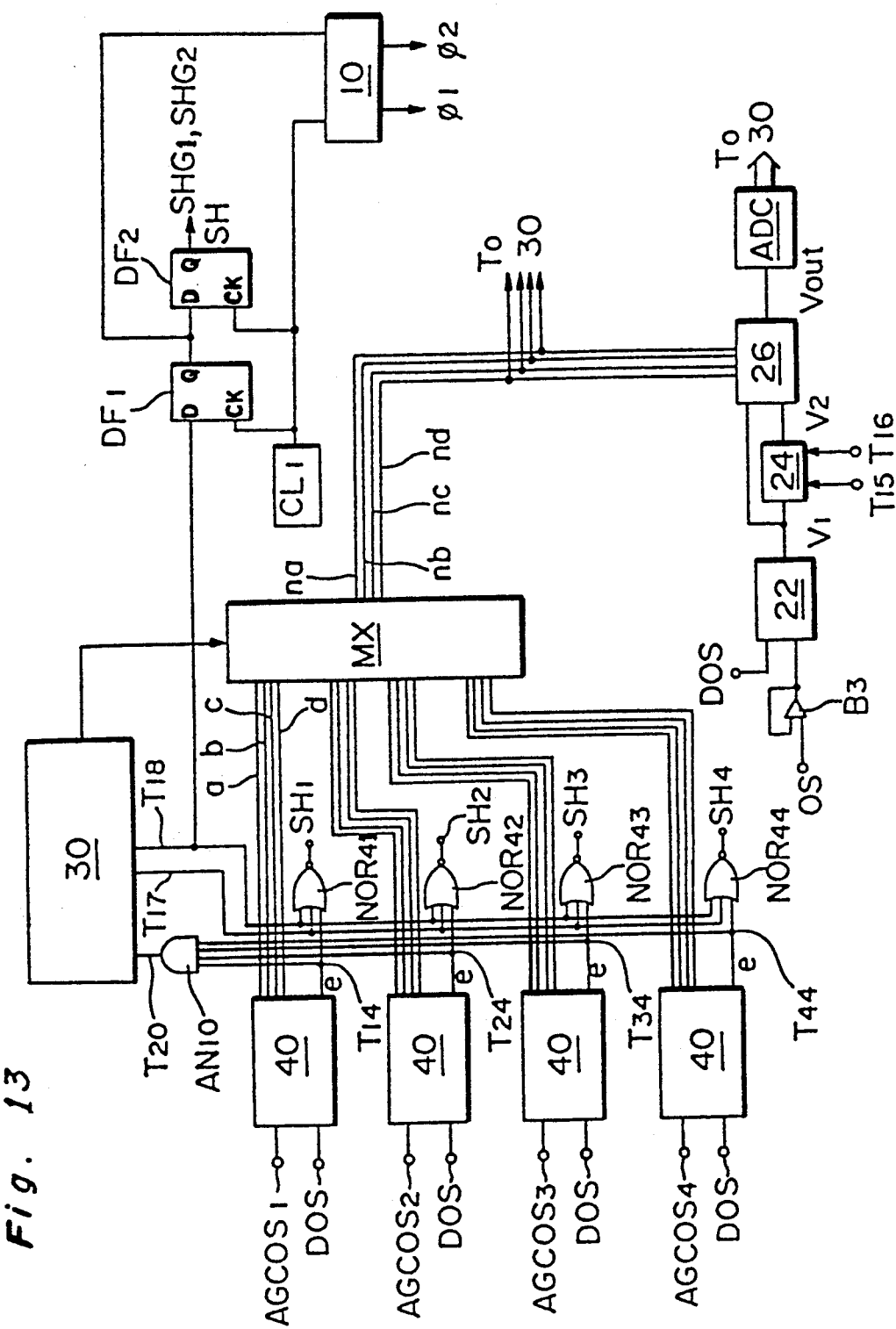
FIG. 13 is a circuit diagram for driving the image sensor of FIG. 12.

Referring to FIG. 13, the structure and the operation of the driving circuit will be described. The circuit shown in FIG. 13 is fundamentally the same as the circuit shown in FIG. 4, but is different in that four brightness detecting circuits 40 receiving the monitor outputs AGCOS1 to AGCOS4 respectively are provided and in that the analog signal processing circuit 20 is provided with a multiplexer MX arranged between the brightness detecting circuits and the amplifier 26. In response to the signal applied to integration clear gate ICG, monitor outputs AGCOS1-AGCOS4 hold voltage level equal to the source voltage. Thereafter, monitor outputs AGCOS1-AGCOS4 gradually decreases at different rates relative to the average brightness in zones 24-1, 24-2, 24-3 and 24-4, respectively.

For example, in connection with the first zone 24-1, if monitor output AGCOS1 is decreased to a predetermined level (I4×R4), a signal at terminal T14 of the first brightness detecting circuit 40 changes its state from a LOW to a HIGH level state, so that the signal SH1 (a signal applied to shift gate SH1 is also designated at SH1), which has been made HIGH by the trailing edge of the signal ICG transmitted from terminal T17 to T16, changes its state from a HIGH level to a LOW level, thereby ending the charge accumulation by FAL1 and FAR1. Thus, the charges accumulated in FAL1 and FAR1 are parallelly shifted to charge accumulation element arrays GAL1 and GAR1. Therefore, any charges generated thereafter from photoelectric converting element array PA1 and/or PAR1 after the ending of the charge accumulation will not flow into charge accumulation element arrays GAL1 and/or GAR1, so that charge accumulation element arrays GAL1 and GAR1 maintain the charges as accumulated at the end of the charge accumulation.

The same operations are carried out for the second, third and fourth zones, so that the charge accumulation by FAL2 and FAR2; FAL3 and FAR3; and FAL4 and FAR4 ends at different moments determined by the decreasing speed of the monitor outputs AGCOS2, AGCOS3 and AGCOS4.

If all the monitor outputs AGCOS1-AGCOS4 are decreased to the predetermined level within a certain period of time, signals at terminals T14, T24, T34 and T44 of the first to fourth brightness detecting circuits are made HIGH, thereby enabling AND gate AN10 to produce a HIGH level signal. This signal will inform microcomputer 30 that the charge accumulation has been completed in each of FAL1 and FAR1; FAL2 and FAR2; FAL3 and FAR3; and FAL4 and FAR4. At this time each of the charge accumulation element arrays GAL1-GAL4 and GAR1-GAR4 is holding appropriate amount of charges representing the image information in the corresponding zone. Upon detection of the signal at terminal T20, microcomputer 30 produces a HIGH level signal from its terminal T18 for setting flip-flops DF1 and DF2 sequentially in synchronized with the clock pulses from pulse generator CL1, thereby adjusting the phase of the transfer clock to produce a HIGH level for the clock $\Phi 1$ and thereafter, turning the second SH gates SHG1 and SHG2 on to shift all the charges in charge accumulation element arrays GAL1, GAL2, GAR1 and GAR2 parallelly to CCD register Rg. Thereafter, the picture element outputs OS are sequentially produced in synchronization with the transfer clocks $\Phi 2$.

On the contrary, if no HIGH level signal is produced from AND gate AN10 to terminal T20 within the predetermined period of time from the start of the charge accumulation, microcomputer 30 forcibly produces a HIGH level signal from terminal T18 to make each of NOR gates NOR41, NOR42, NOR43 and NOR44 to produce a LOW level signal to forcibly end the charge accumulation at FAL1 and FAR1; FAL2 and FAR2; FAL3 and FAR3; and FAL4 and FAR4. Also, by the HIGH level signal from terminal T18, flip-flops DF1 and DF2 are set sequentially in the same manner described above for the same purpose, i.e., to transfer the charges in the charge accumulation elements parallelly to CCD register Rg and further to sequentially produce the output OS.

In response to the individual LOW level signals from NOR gates NOR41, NOR42, NOR43 and NOR44, flip-flops DF3, DF4 and DF5 of the respective brightness detecting circuits 40 store the outputs of the corresponding comparators AC1, AC2 and AC3, respectively, for generation of the gain control signals a, b, c and d controlling the gain of the amplifier 26 depending on the zones 24-1, 24-2, 24-3 and 24-4. The amplifier 26 operates at the gain thus controlled when signals (V2−V1) corresponding to such zones which are too dark to terminate the charge accumulation within the predetermined period of time from the start of the charge accumulation are input thereto through the subtractor 22.

After the generation of the SH pulse, based on analog-to-digital conversion completion signals each generated by the A/D converter ADC after completion of the analog-to-digital conversion of each signal Vout the microcomputer 30 detects which zone the digitalized data signals being inputted correspond to, and produces a zone signal in response to the receipt of the leading signal to the data signals. The zone signal is applied to the analog processing circuit 20 for effecting the switching operation of multiplexer MX to provide the gain control signals a, b, c and d for the detected zone to amplifier 26. Also, in response to the sampling start pulse applied to terminal T15, circuit 24 samples the dark output signals which are produced from the shaded portion Q located at the leading end portion of each of the arrays PALn and PARn and holds the peak one V2 of these dark output signals. The signals V1 following the dark output signals is subtracted by the peak dark output signal V2 at the amplifier 26 to eliminate dark current component contained in the signals V1. Thereafter, the output signals of the amplifier 26 are applied to A/D converter ADC and further to microcomputer 30. After the digitalized data signals in each data block are taken into microcomputer 30, a sampling stop pulse is applied to terminal T16 for clearing the dark output signal V2 to make the circuit 24 ready to sample and hold another dark output signal for the next data block.

In the above described manner, appropriate accumulation time controls are effected in accordance with the average brightness in each zone, and the output signals in each data block are amplified by the amplifier 26 with its gain controlled in accordance with the average brightness of the corresponding zone. Therefore, whatever the average brightness of the respective zones is, output signals can be obtained at appropriate levels for the respective zones.

Referring now to FIGS. 14 and 15, an optical arrangement of two directional focus detecting system in which an image sensor according to another preferred embodiment of the present invention is employed is shown. In FIG. 14, reference numeral 101 represents an objective lens of a photographic camera, reference number 106 represents a condenser lens, reference numeral 108 represents four re-focusing or re-imaging lenses, and reference numeral 110 represents an image sensor. The condenser lens 106 is arranged at a position to form on the objective lens 101 images of four apertures of an aperture mask positioned in front of the four re-focusing lenses 108, as shown by dotted circles in FIG. 14. A view field mask 102 having a cross-shaped opening defined therein is disposed in front of the condenser lens 106 at a predetermined focal plane of the objective lens 1 which is equivalent in position to a plane of a photographic film. The re-focusing lenses 108 form an image of the opening of the viewing mask 102 on the image sensor 110. In this construction, one of the re-focusing lenses 108, for example, the re-focusing lens 108a forms, on the image sensor 110 through the condenser lens 106, an image directed from a section 108A on lens 101, and the re-focusing lens 108b forms, on the image sensor 110 through the condenser lens 6, an image directed from a section 108B on lens 101. In other words, an image formed on the view field mask 102 by the object light having passed through a region of the objective lens 101 defined by the dotted circle of 108A is formed on the image sensor 110 by the re-focusing lens 108a. Similarly, an image formed on the view field mask 102 by the object light having passed through a region of the objective lens 101 defined by the dotted circle of 108B is formed on the image sensor 110 by the re-focusing lens 108b. An elongated rectangular image X1 depicted on the image sensor 110, forming a cross-shaped pattern with other rectangular images X2, Y1 and Y2, corresponds to an image of a horizontal segment of the shape of the cross-shaped opening of the view field mask 102. This image X1 is formed by the re-focusing lens 108a. Another image X2 of the same rectangular shape on the image sensor 110 corresponds to an image of the horizontal segment of the shape of the cross-shaped opening of the view field mask 102 which is formed by the re-focusing lens 108b. Similarly, images Y1 and Y2 correspond, respectively, to vertical segments of the shape of the cross-shaped opening of the view field mask 102 which are formed by the other re-focusing lenses positioned above and below a line between re-focusing lenses 108a and 108b.

The images X1 and X2 are images of the same portion of the target object. When the image formed by the objective lens 101 is focused on the mask 102, i.e., in-focus, the images X1 and X2 will be spaced at a predetermined distance. The distance between the images X1 and X2 becomes greater than the predetermined distance as the image formed by the objective lens 101 is defocused relative to the mask 102 towards the objective lens 101. This defocus is referred to as a front-focus. On the contrary, the distance between the images X1 and X2 becomes smaller than the predetermined distance as the image formed by the objective lens 101 is defocused relative to the mask 102, towards the re-focusing lens 108. This defocus is referred to as a rear-focus.

In view of the foregoing, if a photosensor array is arranged in a direction in which X1 and X2 are lined up, it is possible to determine the direction and the degree of defocus by detecting the distance between the images X1 and X2. The distance between the images X1 and X2 can be detected by calculating correlations between image signals representing image X1 and image X2 while shifting the image signals relative to one another and by finding the amount of shift which provides the best correlation among the calculated correlations. The distance between images Y1 and Y2 can be detected in the same manner. The above technique of detecting the image distance is well known and therefore detailed explanation thereof is omitted here.

In accordance with the above described principle of focus detection, two pairs of photosensor arrays are arranged on the image sensor 110, one in a direction in which images X1 and X2 are lined up and the other in a direction perpendicular thereto in which images Y1 and Y2 are lined up.

Referring now to FIG. 15 in which the objective lens is not shown, the light having passed through the objective lens are deflected by a mirror, disposed rearwardly of a central transparent portion of a single reflex mirror so as to be inclined at an angle of 45°, towards an infrared cut-off filter 103, view field mask 102 and then the condenser lens 106, and is again deflected by a 45°-inclined mirror 104 in a horizontal direction towards the aperture mask 107 and the re-focusing lenses 108 (two pairs and four in total), before it is projected onto image sensor 110. Reference numeral 105 represents a frame structure for uniting all of the above-described elements into a single unit.

While as hereinabove described, the image sensor 110 is of a construction wherein the photosensor arrays are arranged so as to line up in the horizontal direction (in which X1 and X2 are lined up) and also in the vertical direction (in which Y1 and Y2 are lined up), each photosensor array is of the charge accumulation type, preferably defined by a CCD (charge coupled device) sensor array.

Figure 16:
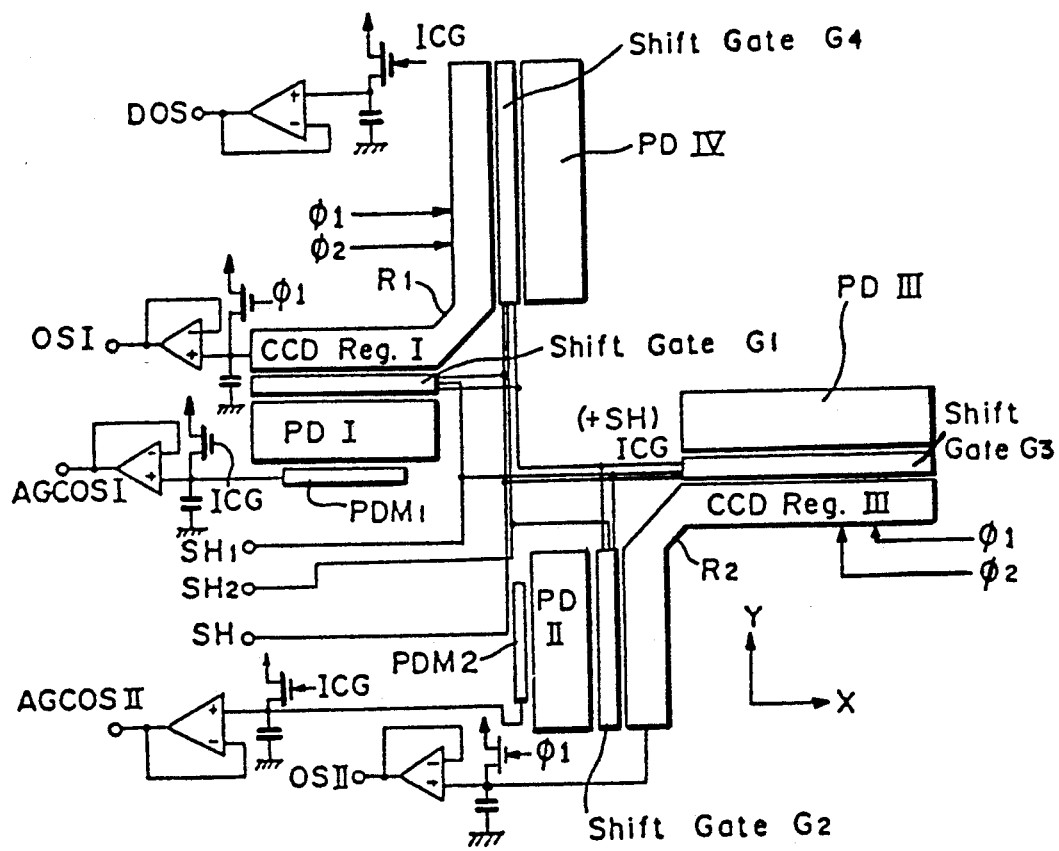
FIG. 16 is a diagrammatic view particularly showing the layout of the image sensor employed in the arrangement of FIG. 14.

FIG. 16 illustrates a circuit arrangement formed on the image sensor used in the embodiment of the present invention.

Referring to FIG. 16, four PD (photodiode) arrays I to IV are shown, of which I and III correspond to the above described photosensor array arranged in the horizontal direction and II and IV correspond to the above described photosensor array arranged in the vertical direction. Namely, PD array I is positioned at a location corresponding to image X1 in FIG. 14; PD array III is positioned at a location corresponding to image X2; PD array II is positioned at a location corresponding to image Y1; and PD array IV is positioned at a location corresponding to image Y2. To determine the charge accumulation time periods for charge accumulation at the PD arrays in accordance with the average brightness of the images projected onto the PD arrays, monitoring photo-diodes PDM1 and PDM2 are arranged along the PD arrays I and II, respectively. Reference characters G1 to G4 represent shift gates for PD arrays I to IV, respectively. The number of the gates is the same as the number of the elements in the PD arrays.

Reference characters R1 and R2 represent CCD analog shift registers. Shift register R1 is provided to receive electrical charges in parallel fashion from PD arrays I and IV in response to shift pulses applied to the shift gates G1 and G4. The timings of the shift pulses applied to the shift gates G1 and G4 are different from each other. Shift register R2 is provided to receive electrical charges in parallel fashion from PD arrays II and III in response to shift pulses applied to the shift gates G2 and G3. Shift registers R1 and R2 are driven by transfer clock pulses $\Phi 1$ and $\Phi 2$, having opposite phase, to sequentially output the electrical charges received thereby.

For the purpose of the description of the present invention, some terminology is fixed as follows. With respect to the direction of the photosensor arrays, the terms "X-direction" (horizontal direction) and "Y-direction" (vertical direction) are used as shown in FIG. 14. These two directions are identified by respective arrows X and Y in FIG. 16. A term "total contrast" is to be understood as meaning the sum of absolute values of differences of the neighboring difference data in the image signal. The greater the difference between dark and bright, or the more finely dark and bright are mixed, the higher the total contrast. A term "LOW CON" is an abbreviation of a "Low Contrast" which means that the reliability of the focus detection is low. Hereinafter, the structure of various components of the device and the operation thereof will be described.

Referring still to FIG. 16, CCD analog shift registers R1 and R2 carry out charge transfer in response to the two-phase clocks $\Phi 1$ and $\Phi 2$. Connected to output terminals thereof are voltage converters and buffers, and accumulated charges of the PD arrays I and IV are outputted from a terminal OSI through the analog shift register R1 whereas accumulated charges of the PD arrays II and IV are outputted from a terminal OSII through the analog shift register R2. Connected to the monitoring photodiodes PDM1 and PDM2 are voltage converters and buffers which are so constructed in a manner similar to the voltage converters and the buffers connected to the output terminals of the registers R1 and R2. Accumulated charges of the monitoring photodiode PDM1 and those of the monitoring photodiode PDM2 are outputted from terminals AGCOSI and AGCOSII, respectively, through the voltage converters and the buffers. For the purpose of generating a reference voltage to be compared with the outputs from terminals AGCOS1 and AGCOS2, there is provided a voltage converter to which no photodiode is connected or to which an aluminum-covered photodiode is connected. The outputs from terminals AGCOS1 and AGCOS2 and the reference voltage are used to control the timing of generation of shift pulses as will be described later.

The shift gates G1 and G3 correspond to the PD arrays I and IV in the X-direction and are applied with a common shift pulse SH1 through a terminal SH1. Similarly, the shift gates G2 and G4 correspond to the PD arrays II and IV and are adapted to be applied with a common shift pulse SH2 through a terminal SH2. Each of the shift gages G1 to G4 can be applied with another shift pulse SH at one time through a terminal SH. Since the image signal obtained from the PD arrays must respectively have a signal level sufficient for signal processing for the focus detection to be accomplished regardless of the brightness of the target object, the charge accumulation time periods for the respective arrays are controlled by the outputs from terminals AGCOS1 and AGCOS2. In this instance, since the average brightnesses of stripe portions of a target object in the X-direction and the Y-direction may often differ from each other, arrangement has been made so that the shift pulses SH1 and SH2 can be applied separately.

The PD arrays I to IV can be all cleared simultaneously by a clear pulse ICG and, upon disappearance thereof, charge accumulation at each PD array is initiated. If the average brightness of the stripe portions of the target object is higher in the X-direction than in the Y-direction, the shift pulse SH1 is first outputted and the electrical charges accumulated in the PD arrays I and III are once retained at the shift gates G1 and G3. When the charge accumulation a the PD arrays II and IV attain an appropriate level, the shift pulse SH2 is generated and the electrical charges accumulated in the PD arrays II and IV are once retained at the shift gates G2 and G4. When the shift pulse SH is subsequently applied to the gates G1 to G4 simultaneously, the electrical charges retained in the gates G1 to G4 are all transferred to the shift registers R1 and R2.

Figure 17:
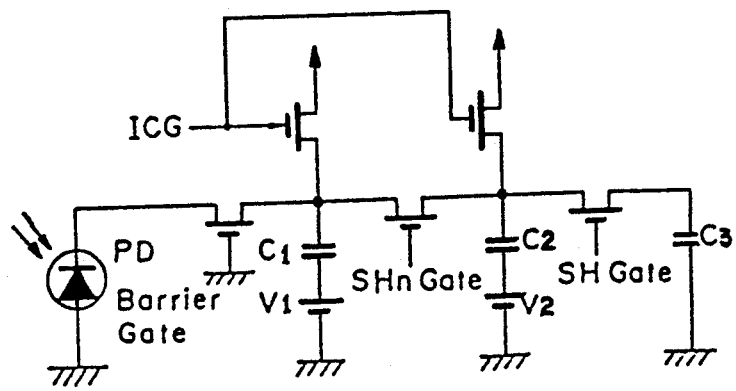
FIG. 17 is an equivalent circuit diagram showing an arrangement of one pixel of the respective photosensor arrays.

As hereinabove described, the shift gates G1 to G4 have a function to temporarily retain the electrical charges from the PD arrays I to IV and then to parallel transfer them to the shift registers R1 and R2. A circuit construction required therefor to achieve this function is shown in FIG. 17. FIG. 17 illustrates a circuit construction of the gates for one pixel. A charge generated by a photoelectric converting element of a PD array is accumulated through a barrier gate in a first accumulator C1 which is once cleared by a clear pulse ICG through a barrier gate to restore its potential to a level approximately to a power source level. When the outputs from terminals AGCOS1 or AGCOS2 has changed from the level of the reference output from terminal DOS by a predetermined level, the shift pulse SH1 or SH2 is applied to a first shift gate SHn to cause the charge accumulated in the first accumulator C1 to be transferred to a second accumulator C2. At this time, by the effect of the difference in capacitance between accumulators C1 and C2 and potential between voltage sources V1 and V2, the charge transfer is substantially completely performed. In this manner, the charge accumulated during a time period from the disappearance of the ICG pulse to the application of shift pulse SH1 or SH2 is transferred from the accumulator C1 to C2. In this second accumulator C2, no photoelectric current is generated and the amount of charge thereof is substantially retained. Then, by applying a shift pulse SH to a second shift gate SH, the charge accumulated in the second accumulator is transferred to a third accumulator C3 of the CCD analog register, and thereafter, this charge is outputted from terminal OSI or OSII in synchronism with transfer clocks.

Figure 18:
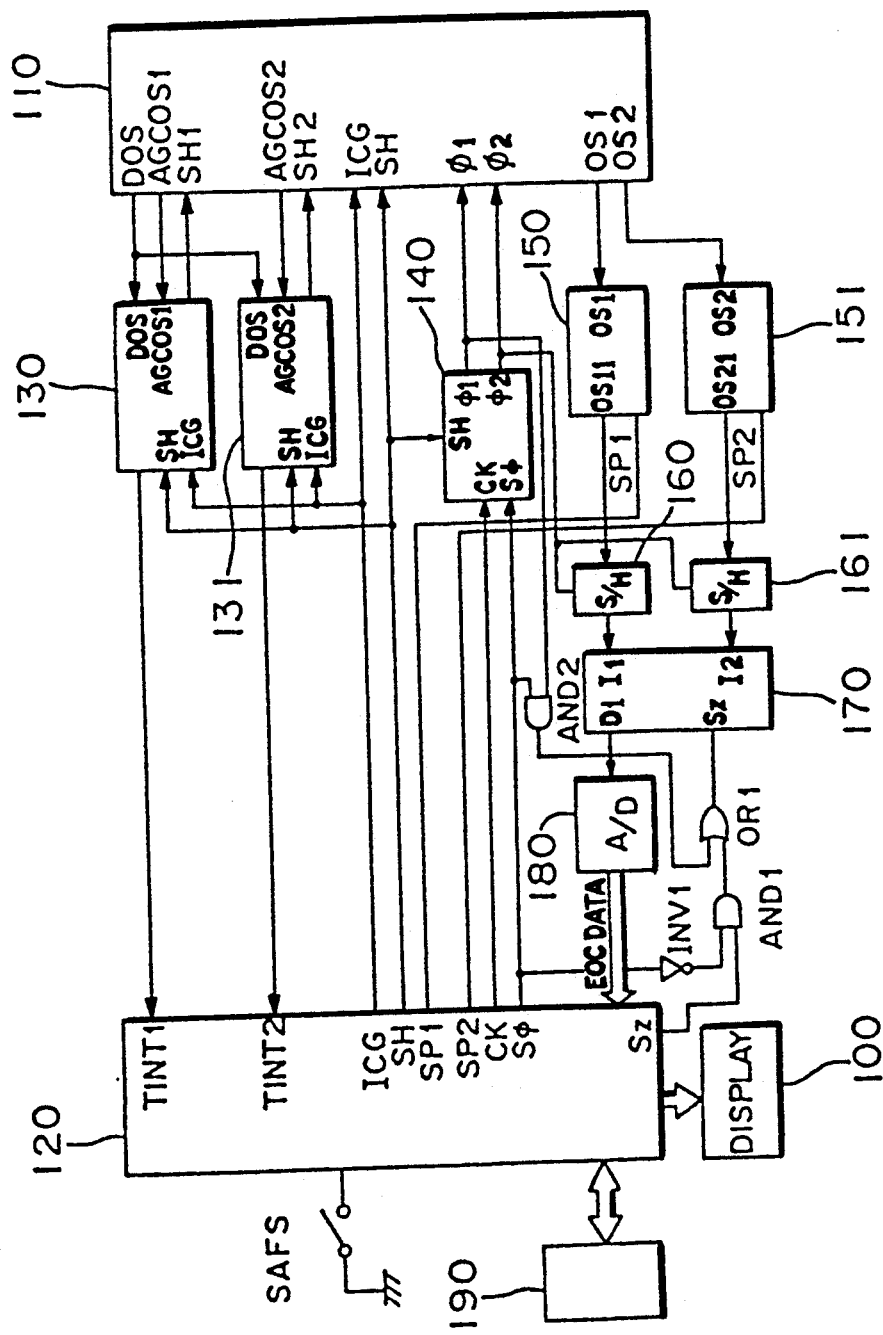
FIG. 18 is a circuit diagram for driving the image sensor of FIG. 16.

A circuit construction for driving the image sensor of FIG. 16 to perform the focus detection and the focus adjustment is shown in FIG. 18.

Figure 19:
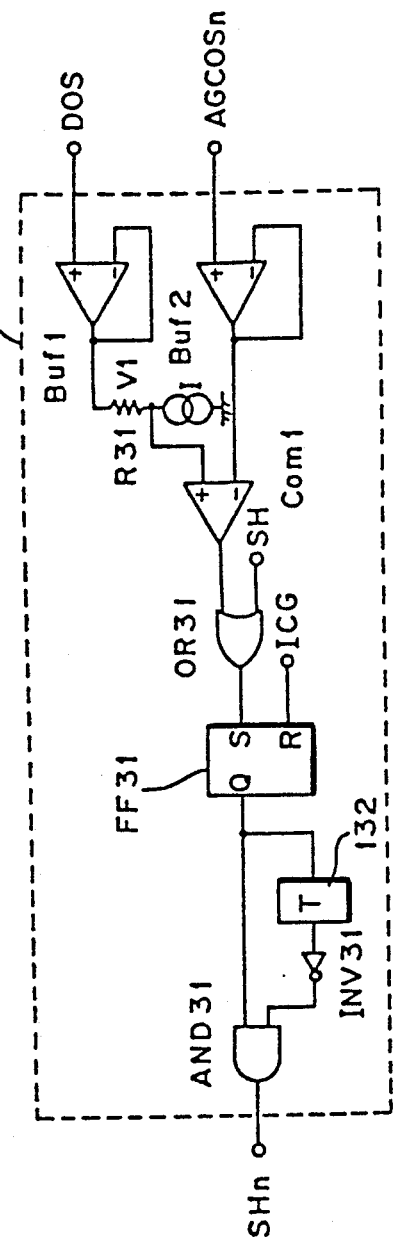
FIG. 19 is a detailed circuit diagram of a shift pulse generating circuit employed in the circuit of FIG. 18.

Referring to FIG. 18, reference numeral 120 represents an AF microcomputer for driving the image sensor 110, for carrying out a focus detection based on image signals from the image sensor 110, and for driving the lens through a motor drive circuit as well as controlling display carried out by means of an in-focus condition display circuit 100 based on the result of the focus detection. The AF microcomputer starts is operation upon closure of an AF start switch SAFS. Reference numeral 130 represents a shift pulse generating circuit for generating the shift pulse SH1 used for causing the PD arrays I and IV in the X-direction to terminate their charge accumulation, and reference numeral 131 represents a shift pulse generating circuit for generating the shift pulse SH2 used for causing the PD arrays II and IV in the Y-direction to terminate their charge accumulation. The circuits 130 and 131 are constructed as shown in FIG. 19, respectively. The reference voltage DOS from terminal DOS is inputted to a buffer circuit Buf1 and, from its output, a voltage which is reduced a constant voltage $\Delta V1$ determined by a resistor R31 and a constant current I31 is applied to a non-inverting input of a comparator Com1. An inverting input of this comparator Com1 is applied with a monitor output AGCOSn (n=1 or 2) from terminal AGCOS1 or AGCOS2 through a buffer Buf2. Although by the application of a clear pulse ICG both of the outputs DOS and AGCOSn become equal in potential to each other, the potential of AGCOSn is subsequently reduced to an amount equal to the charge produced in the monitoring photodiode PDM1 or PDM2, that is, reduced in proportion to the amount of the incident light. In terms of the input level of the comparator Com1, the (−) input is high by $\Delta V1$ at the time of application of ICG, but decreases with the charge accumulation at the monitoring photodiode PDM1 or PDM2, and the output of the comparator is inverted when the (−) input becomes lower than the (+) input. A constant voltage $\Delta V1$ ($=R31 \times I31$) is so selected that, when the focus detection is carried out with use of image signals obtained from the charge accumulation which ends at the time of this invention, a proper result of focus detection can be obtained. At this time, an inverted signal of this comparator Com1 passing through an OR gate OR31 sets a flip-flop FF31 which has been reset by a pulse ICG, and the output Q of the flip-flop FF31 inverted from a LOW level to a HIGH level is converted to a pulse by AND31, INV31 and a delay circuit 132. This pulse is the pulse SHn (n−1 or 2). The time period beginning from the application of the pulse ICG and ending with the outputting of the pulse SHn is required to be increased at the brightness reduces. If the inversion of the output of the comparator Com1 does not take place within a predetermined maximum charge accumulation time period, a shift pulse SH is generated from the microcomputer to set the flip-flop F31 through the OR gate OR31, so that the shift pulse SHn is forcible generated to end the charge accumulation. These procedures for the low brightness are substantially identical with those described in U.S. patent application Ser. No. 763,338 which is a continuation of Ser. No. 669,107, abandoned (assigned to the same assignee as the present application).

Figure 20:
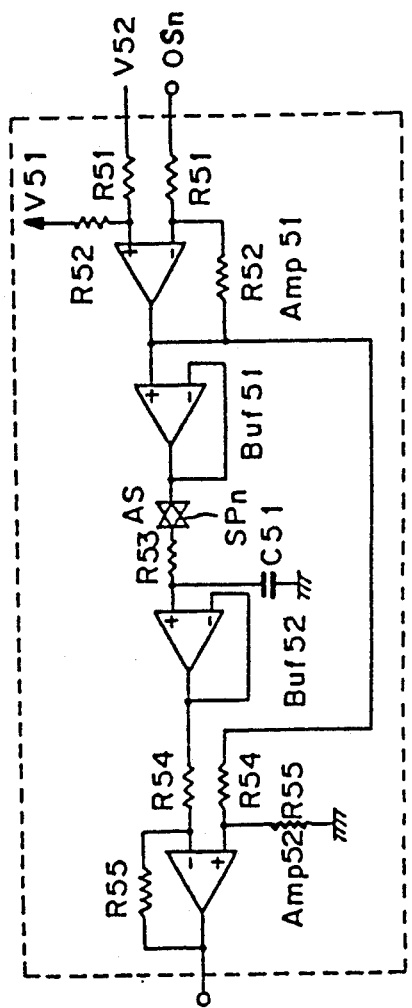
FIG. 20 is a detailed circuit diagram of analog processors employed in the circuit of FIG. 18.

A circuit 140 is a transfer clock generator for generating pulses $\Phi 1$ and $\Phi 2$ by dividing the standard clock pulses supplied from the microcomputer to a CK terminal. An S$\Phi$ terminal receives from the microcomputer 120 a signal for switching the transfer clock frequency. This signal will be HIGH when both of the outputs in the X-direction and the Y-direction are inputted, but will be LOW when only one of the outputs in the X-direction and the Y-direction is inputted. Thus, circuit 140 has an arrangement to reduce the charge transfer time for generation of only one of the outputs in the X-direction and in the Y-direction by producing transfer clocks having a frequency which is twice the frequency of transfer clocks produced for generation of both of the outputs in the X-direction and the Y-direction. Also, the shift pulse SH is inputted to the circuit 140 since it is necessary to synchronize the transfer clocks with the charge transfer from the second accumulator C2 to the analog shift register. Reference numerals 150 and 151 represent analog processors for the pixel outputs OSI and OSII, a basic construction of which is shown in FIG. 20. Each pixel output is outputted from a differential amplifier Amp 51 in the form as a difference relative to the reference voltage V52. The outputs of the amplifier Amp 51 are sampled by a signal SP1 or SP2 outputted from the microcomputer 120 during a sampling period in which dark output signals are outputted from the aluminum-covered pixels provided at a leading end portion of each of the photoelectric diode array PDI to IV, so as to be held by C5 as a dark current component. The outputs of the amplifier Amp 51 generated after the lapse of the sampling period are subtracted by the outputs held by C5 at a differential amplifier Amp 52, so that the dark current component is eliminated therefrom.

Figure 21A:
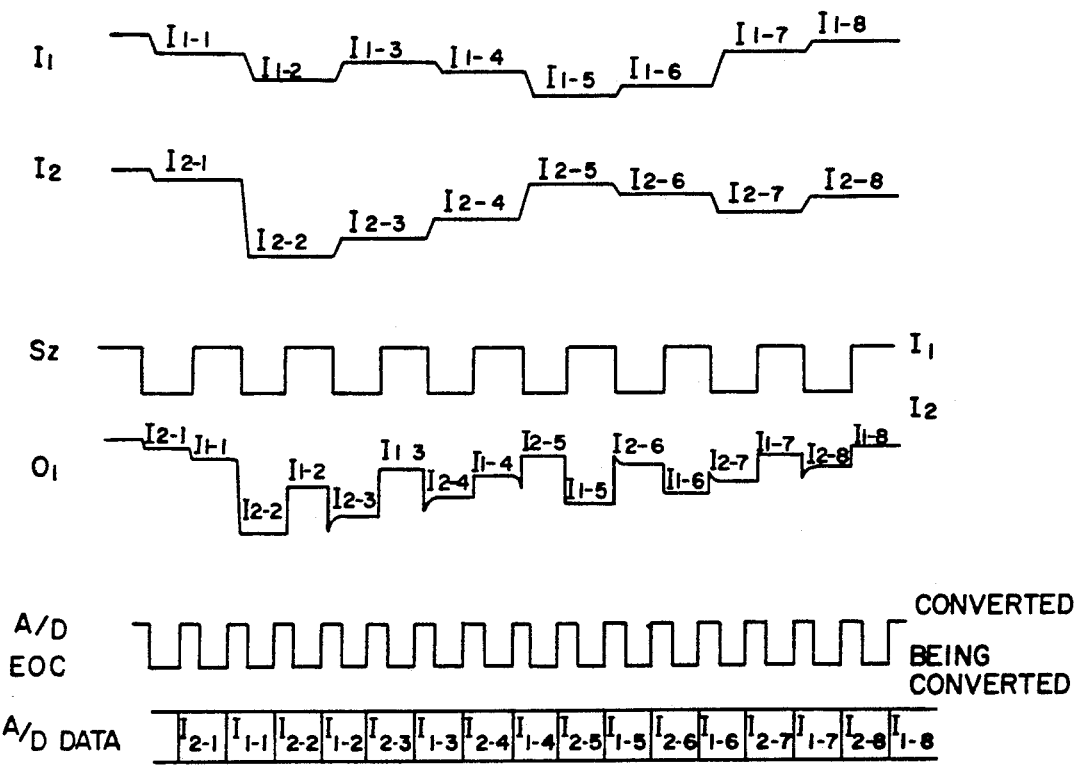
FIGS. 21a and 21b show time charts of various signals obtained from the circuit of FIG. 18.

The reason why the dark output signal are sampled and held with respect to each PD array I to IV is that the charge accumulation at the PD arrays I and III and that at the PD arrays II and IV are controlled at different charge accumulation time periods, or creating a difference between the dark output signals of the PD arrays I and III and those of PD arrays II and IV. The pixel outputs from the analog processors 150 and 151 containing no dark current component are respectively applied to sample-hold circuits 160 and 161, and in turn to a multiplexer 170 as I1 and I2. Multiplexer 170 selects the pixel outputs I1 or I2, which are sampled and held, in response to an input data selection zone signal SZ from the microcomputer 120 and generates it from a terminal D1 to an analog-to-digital converter 180.

Where the data inputs in both of the X and Y directions to be performed as hereinbefore described, the microcomputer 120 generates an S$\Phi$ signal having a HIGH level to cause the transfer clock generator 140 to generate the transfer clocks of an ordinary frequency as well as to cause the multiplexer 170 to change its output from terminal D1 through AND2 and OR1 in synchronism with the transfer clock $\Phi 1$. As a result, as shown in a timing charge of FIG. 21a, output signals from the CCD shift registers R1 and R2 are alternately generated and digitalized by the analog-to-digital converter 180 to be inputted to the microcomputer.

Figure 21B:
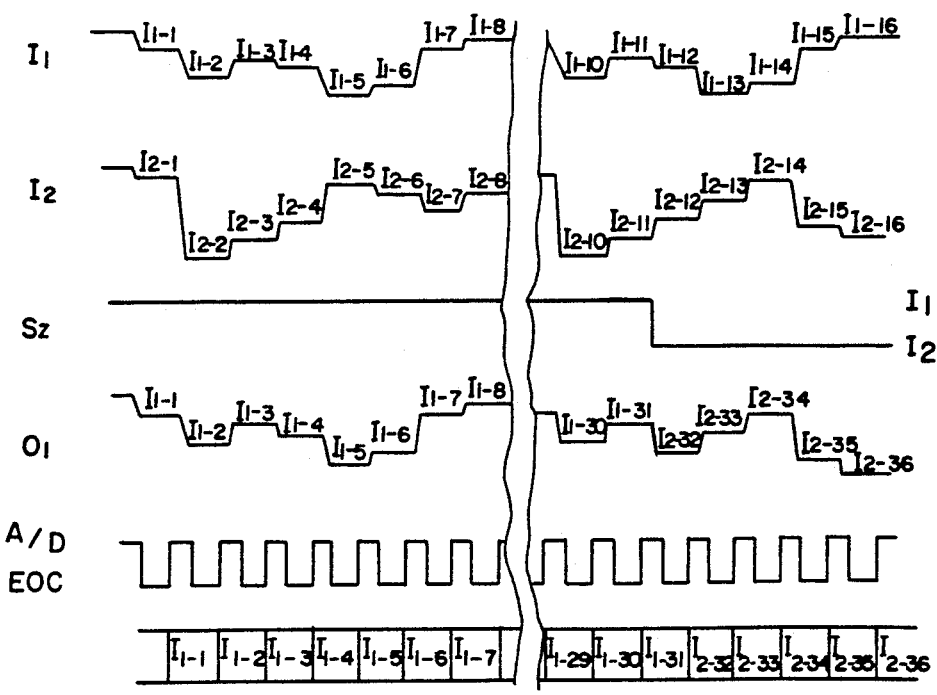

On the contrary, where the data inputs in only one of the X-direction and the Y-direction is to be performed, the S$\Phi$ signal is rendered to be LOW and one input of AND2 is rendered to be LOW and, therefore, the output switching of the multiplexer 170 depends on the selection signal SZ from the microcomputer. At this time, the frequency of the transfer clocks applied to the CCD image sensor 110 from the transfer clock generator 140 becomes double as compared with the ordinary frequency. The microcomputer is at first inputted from register R1 with standard area output signals of the PD array I in the case of the data inputs in the X-direction or with reference area output signals of the PD array IV in the case of the data inputs in the Y-direction, and then, by inverting the SZ signal, is inputted from the register R2 with the reference area output signals of the PD array III in the case of the data inputs in the X-direction or with the standard area output signals of the PD array II in the case of the data inputs in the Y-direction. Thus, by the maximum utilization of the period required for analog-to-digital conversion, the data transfer time can be shortened. The timing chart of this case is shown in FIG. 21b.

In the two dimensional focus detecting system so far explained, a number of operating modes are possible in carrying out focus detection. Examples of three operating modes are shown in flowcharts of FIGS. 22a and 24c.

FIGS. 22a and 22b illustrate a flowchart for carrying out a lens drive operation based on the result of the focus detection by the PD arrays aligned in X- or Y-direction. The PD arrays I and III aligned in the X-direction are selected when the object detected by these PD arrays is located closer to the camera than the object detected by the PD arrays II and IV aligned in the Y-direction. The PD arrays II and IV aligned in the Y-direction are selected in a similar manner.

Figure 23B:
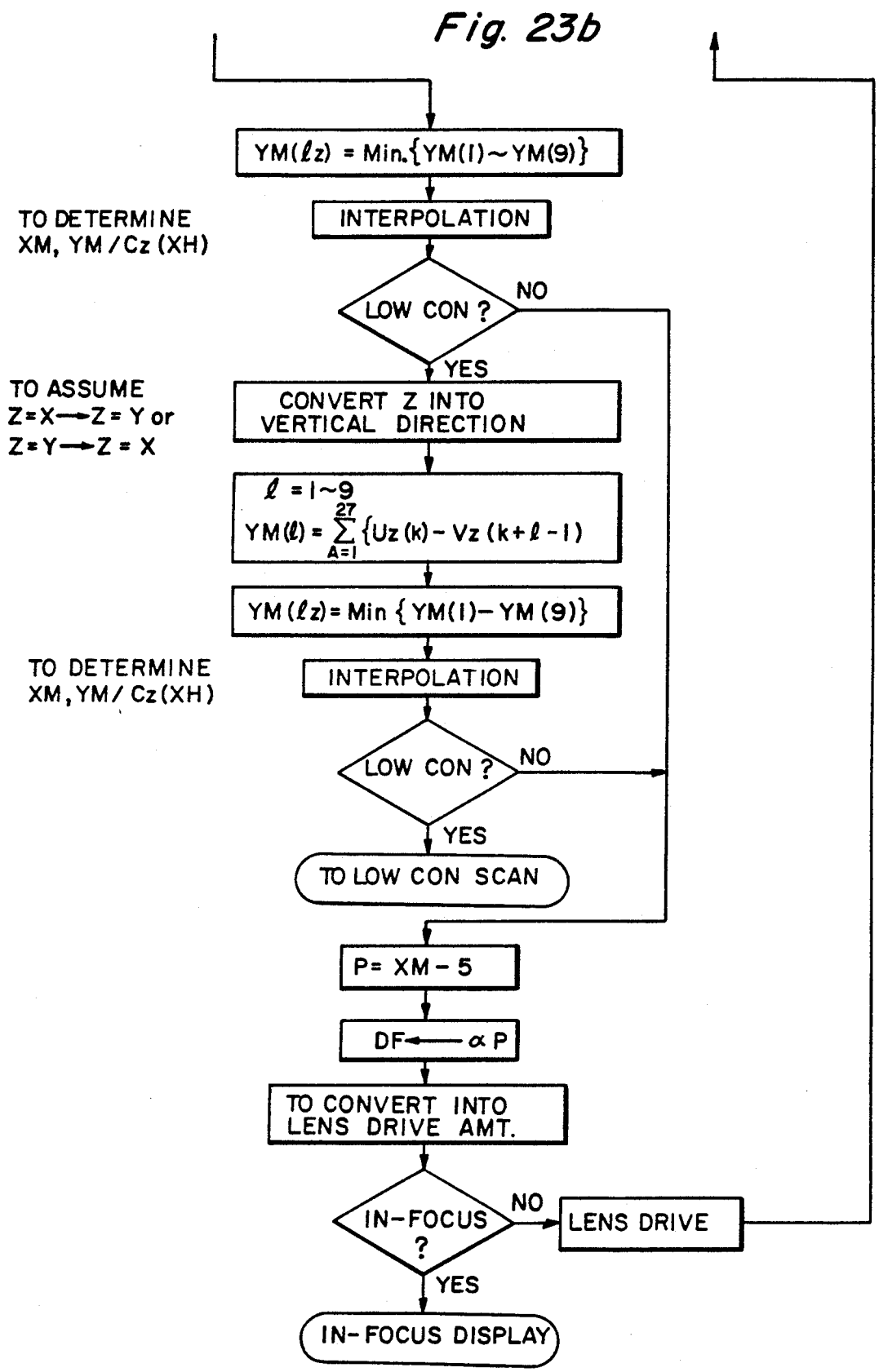

FIGS. 23a and 23b illustrate a flowchart for carrying out a lens drive operation based on the result of the focus detection by the PD arrays aligned in X- or Y-direction, which are judged as receiving images of a higher contrast through comparison of the total contrast between the images in both of the X- and Y-directions. If the contrast of the images of the PD arrays once judged as receiving images of a higher contrast becomes low (Low Con), as a result of the lens drive operation, then the subsequent lens drive operation will be performed based on the result of the focus detection by the PD arrays in the other direction. It is to be noted that, the judgement of "Low Con" may be made also when the evaluation function YM(XN)/CN shows a value higher than a predetermined level. The evaluation function YM(XN)/CN is obtained through the correlation calculation, as suggested in U.S. patent application Ser. No. 735,569 assigned to the same assignee as the present application, and it shows a high value, such as in the case where far and close target objects are in competition within the focus detection area defined by the opening of the view field mask 102.

Figure 24B:
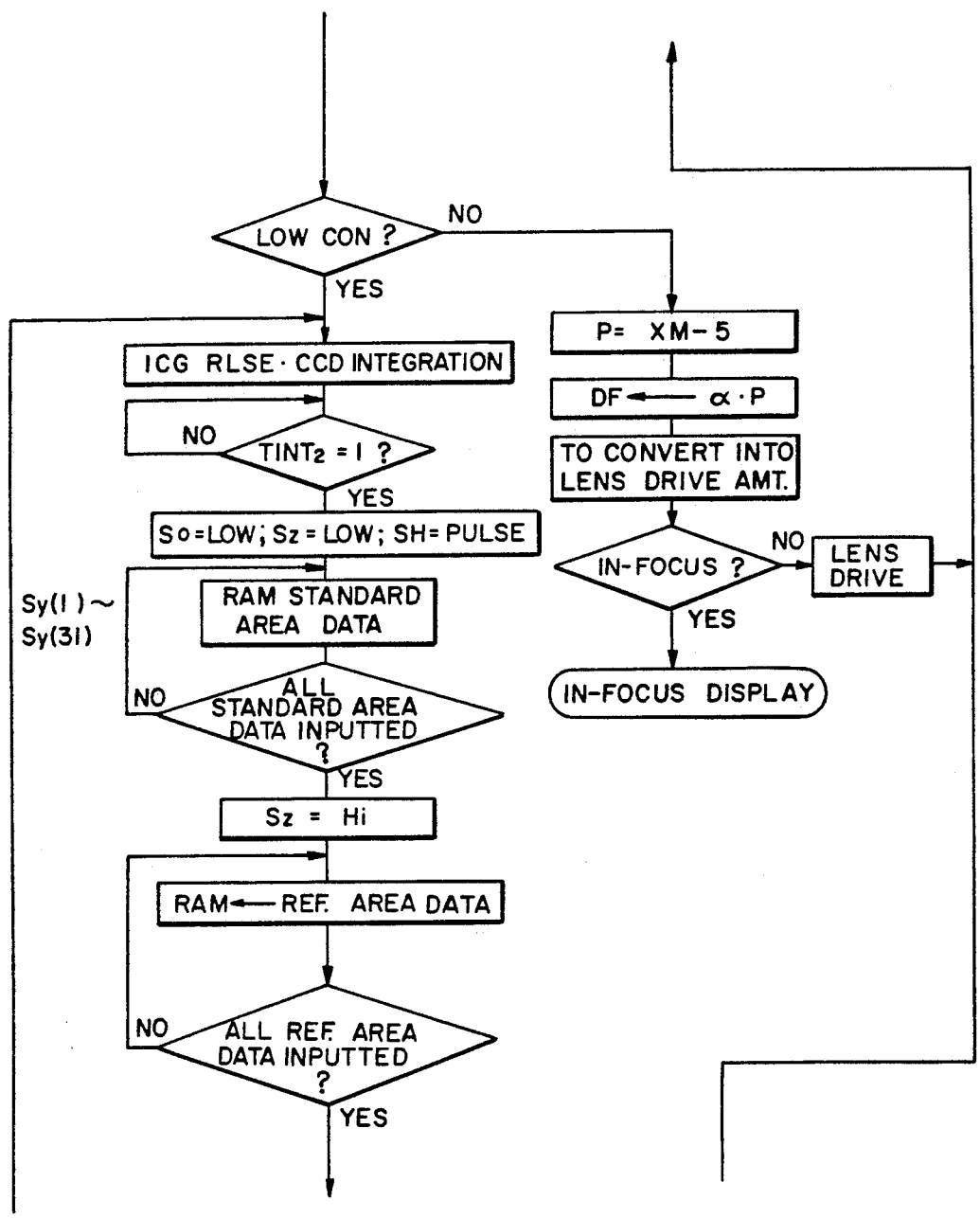
Figure 24C:
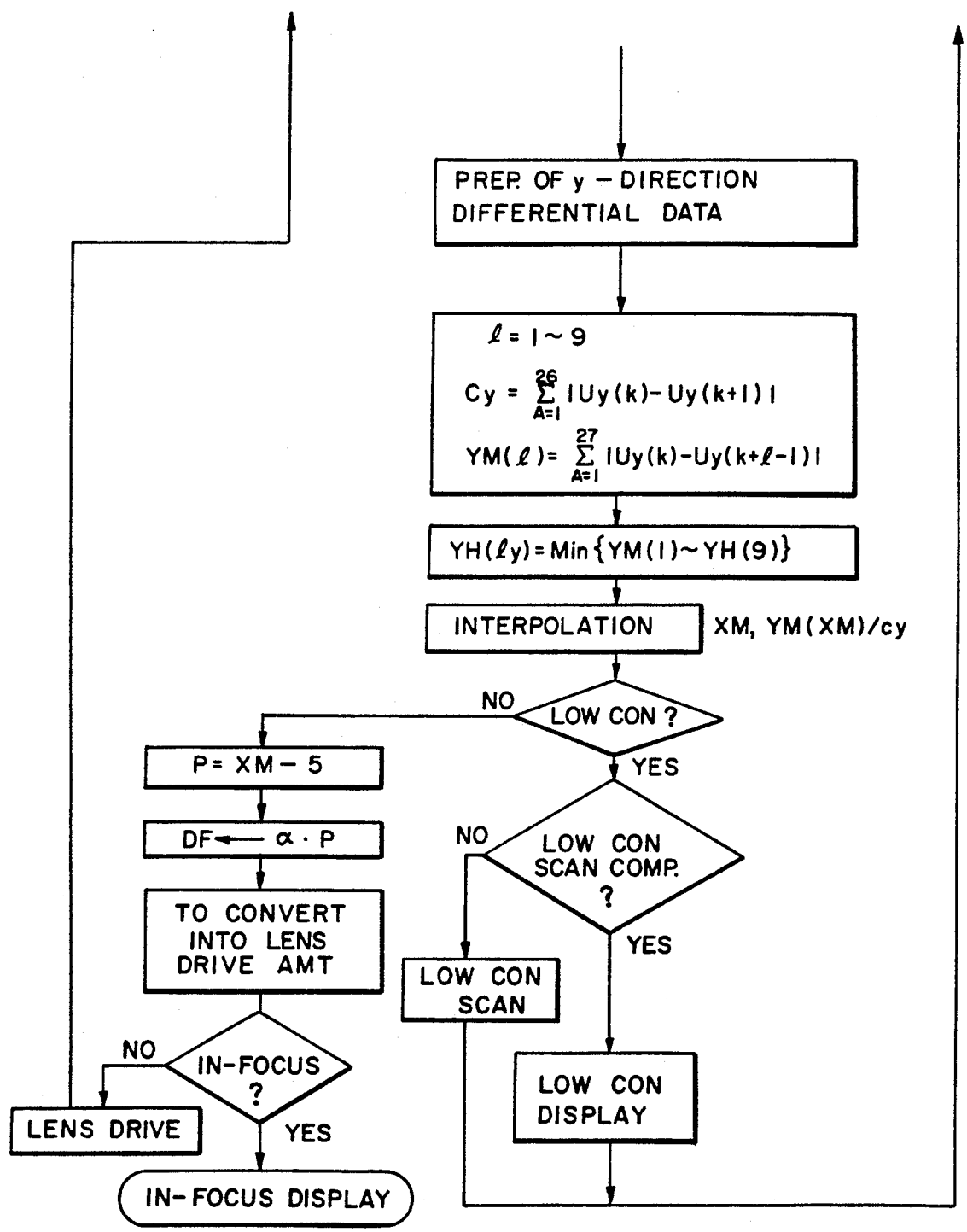

FIGS. 24a, 24b and 24c illustrate an example of a flowchart for carrying out a lens drive operation based on the result of the focus detection by preferential use of the PD arrays I and III aligned in the X-direction. The focus detection by use of the PD arrays II and IV aligned in the Y-direction is performed only when "Low Con" occurs in the X-direction.

Reference will first be made to FIGS. 22a and 22b.

When the AF switch SAFS is turned on, the microcomputer 120 is started. At first, the microcomputer initializes the CCD image sensor 110. This is always necessary at the time of power supply so as to expel unnecessary charges accumulated in the registers R1 and R2 and in the PD arrays I to IV. The unnecessary charges will be accumulated prior to the supply of an electric power or during a period when no transfer clock pulse is applied.

Subsequently, the microcomputer 120 supplies the ICG pulse to the CCD image sensor 110 to initiate the charge accumulation at the respective PD arrays. Upon the application of this ICG pulse, the image sensor expels charges accumulated in the PD arrays I to IV and charges accumulated in the monitor photodiodes PDM1 and PDM2. Then, when the ICG pulse disappears, the charge accumulation starts in the respective PD arrays and the monitor photodiodes. Thereafter, the microcomputer is brought into a wait condition until the shift pulses SH1 and SH2 generated respectively upon the inversion of the output of the comparator Com 1 in the circuits 130 and 131 are received at both TINT1 and TINT2 terminals, that is, when the average amount of charges accumulated in the PD arrays I and IV and that of the charges accumulated in the PD arrays II and IV reach a predetermined level, respectively. Then, each of the accumulated charges in the PD arrays I and IV and each of the accumulated charges in the PD arrays II and IV are transferred to the second accumulator C2 of corresponding pixel. When the microcomputer detects the completion of the transfer, it generates the SH pulse with which the accumulated charges in the second accumulators C2 of the PD arrays I and IV and those in the second accumulators C2 of the PD arrays II and IV are parallelly transferred to the analog shift registers R1 and R2, respectively.

Thereafter, in synchronism with the transfer clocks, the pixel outputs are outputted from the terminals OSI and OSII, and thereafter the microcomputer detects the number of the outputted pixel outputs by counting A/D conversion completion signals A/DEOC, each representing completion of A/D conversion of a pixel output and outputs dark output sampling signals SP1 and SP2 for sampling and holding the outputs of the aluminum-covered pixels of the PD arrays I to IV and then sequentially takes in the digitalized pixel outputs which are corrected by the sampled and held outputs. The timings of these operations will be described later. When the pixel outputs in the digital form produced from every one of the pixels have been taken into the microcomputer, the microcomputer starts the calculations for the focus detection. Then, the microcomputer first performs a correlation calculation in the X-direction. For this purpose, the preparation of X-direction differential data is carried out with respect to the standard area outputs Sx of the PD array I and the reference area outputs Tx of the PD array III. The differential data is obtained by taking a difference between every other four data as given below.

$$Ux(k) = Sx(k) - Sx(k+4) \ (k=1 \ldots 27)$$

$$Vx(k) = Tx(k) - Tx(k+4) \ (k=1 \ldots 35).$$

This is for the purpose of cutting a low frequency component which makes accurate focus detection difficult. When 27 differential data Ux of the standard area and 35 differential data Vx of the reference area are obtained, the microcomputer increments the image shifting amount by one pitch and calculates a correlation value YM(l) for each image shifting amount. Also, the total contrast value, that is, the sum of the neighboring data of the differential data is calculated. In this manner, the image shifting amount lx at which the correlation value YM(l) attains a minimum value is detected. This lx is related with the defocus amount of the image formed by the lens 101, but in the system now under discussion, interpolation is carried out using the correlation values UM(lx), UM(lx−1) and YM(lx+1) in order to improve the accuracy of the focus detection. The above mentioned interpolation is described in U.S. patent application Ser. No. 570,012 assigned to the same assignee as the present application, and therefore reference may be had thereto for the details thereof. By this interpolation, the real image shifting amount XM, and the correlation evaluation function YM(XM)/CX can be accurately determined. With the use of the correlation evaluation function YM(XM)/CX, the total contrast value CX and peak values of all outputted data, determination of "Low Con" is carried out. A method of determining this "Low Con" is discussed in detail in the above mentioned U.S. patent application Ser. No. 735,569, and therefore, the details thereof are not herein described for the sake of brevity. It is to be noted that it is determined as "Low Con" where the correlation value at both ends of lx=1 or 9 is minimal.

If it is not determined as "Low Con", a value (XM−5) which is the difference of the between the shifting amount XM and the shifting amount 5 in-focus condition is stored as PX representing the amount of image deviation from an in-focus point. Also, (lx−1) is stored as lmin so that the range of image shifting for the correlation calculation in the Y-direction is restricted to (lx−1). However, if it is determined as "Low Con", the correlation calculation in the Y-direction is carried out over the entire range without providing the range of image shifting with any restriction. After the storage of (lx−1) as lmin to restrict the range of image shifting for the correlation calculation in the Y-direction, differential data in the Y-direction is prepared in a manner similar to that in the X-direction. Thus, the differential data are given by $$Uy(k) = Sy(k) - Sy(k+4) \ (k=1 \ldots 27)$$

$$Vy(k) = Ty(k) - Ty(k+4) \ (k=1 \ldots 35).$$

Using this data, the calculation of the correlation value is carried out in a manner similar to that in the X-direction. However, the range of image shifting for this correlation calculation is set to be not less than lmin(=lx−1). The closer the target object is, the greater the interval between the images thereof in the X and Y directions, respectively. As a main object is located at a closer position at a higher probability than a background object, it is thus reasonable to select the greater one of the amounts of the image deviation from the in-focus point in the X- and Y-direction. For this reason, it is enough to carry out the correlation calculation in the Y-direction only in the range where the image deviation amount shows a greater value than the image deviation amount which has been previously obtained in the X-direction. In this way, the period required for the correlation calculation in the Y-direction may be advantageously shortened. Through the correlation calculation, the minimum correlation value YM(ly) in the Y-direction is determined and then interpolation is performed in a manner similar to that in the X-direction. As a result, the image shifting amount XN and the correlation evaluation function YM(XN)/Cy are calculated. The correlation evaluation function YM(XN)/Cy, the total contrast amount Cy in the Y-direction, and peak value of the row data in the Y-direction are determined for judgement of "LOW CON", followed by the determination of whether or not the calculated image shifting amount ly providing the minimum correlation value is at both ends of the image shift range, i.e., lmin or 9. If it is not determined as "Low Con", (XN−5) which represents the image deviation amount from the in-focus position is stored as PY.

Upon the completion of the correlation calculations in the X-direction and the Y-direction, the microcomputer controls the lens drive operation on the basis of the result of the correlation calculations in the X-direction and the Y-direction.

Where "Low Con" is indicated in both X- and Y-directions, the microcomputer performs an operation (Low Con Scan) to drive the lens in search of a lens position at which a contrast can be detected. In this operation mode, the lens drive is interrupted after one complete scan over the entire movable range of the lens has been made for at least one time, and then only the focus detection operation is repeated at such lens position so that the lens drive operation can be re-started immediately if a contrast sufficient for focus detection happens to be detected.

Where it is detected as not "Low Con" in at least one of the X- and Y-directions, a comparison of magnitude of the image deviation amounts Px and Py in the X-direction and Y-direction is carried out, and the greater one is employed as the P for the image deviation amount to be used for determining the amount of the subsequent lens drive. Under the condition of "Low Con", the value of Px or Py is assumed to be set to the Min value (−4).

The reason why the magnitude comparison between Px and Py is carried out notwithstanding the image shift range restriction imposed during the calculation in the Y-direction is that a considerable amount of defocus is observed within the amount of image shifting by one pitch, and therefore, a great difference will result in the defocus amount with values obtained by the interpolation.

Subsequently, the microcomputer converts the calculated image deviation amount P into the defocus amount DF and multiplies the defocus amount DF by a coefficient of lens drive amount conversion inherent to each lens to determine the amount of the lens drive. Then, the microcomputer judges whether the condition is in-focus or not. If the lens drive amount is so extremely small that no lens drive is needed, the condition is judged as in-focus and an in-focus display is effected. However, it if is necessary to drive the lens for some distance before obtaining the in-focus condition, the lens drive is effected according to the calculated lens drive amount, and the re-accumulation of electrical charges in the image sensor is effected for enabling the focus detecting operation again.

Next, explanation will be given of the operation of the focus detecting device shown in FIGS. 23a and 23b, wherein the correlation calculation in the direction in which the total contrast amount is greater is preferentially carried out to effect the lens drive, the correlation calculation in the other direction is initiated only when "Low Con" condition is established under the influence of, for example, the far and close objects happening to align in that preferential direction, so that the lens drive can be effected on the basis of the result of the correlation calculation in the other direction.

In a manner similar to the process from the start of operation of the completion of the data input shown in FIGS. 22a and 22b, data from the image sensor in the X-direction and the Y-direction are loaded in the microcomputer. The microcomputer prepares the differential data in the X-direction in a manner similar to that in FIGS. 22a and 22b and calculates the total contrast value Cx in the X-direction by detecting the sum of the neighboring differences of the differential data. Subsequently, the differential data in the Y-direction is prepared and, similarly, the total contrast value Cy in the Y-direction is calculated. After the calculation of the total contrast values Cx and Cy in the X-direction and the Y-direction, respectively, both are compared as to the magnitude.

The result of the correlation calculation with respect to the direction in which the total contrast value is high is generally considered more reliable than that in which the total contrast value is low.

In view of the above, the correlation calculation in the direction Z (Z=X or Y) in which the total contrast value is higher than in the other direction is preferentially carried out. This correlation calculation is effected by the use of a technique substantially identical with that shown in FIGS. 22a and 22b. The determination of the minimum correlation value and the interpolation are carried out to determine the real image shifting amount XM and the correlation evaluation function YM(XM)/CZ. Using this result, determination of "Low Con" is performed, and if it is not detected as "Low Con", the image deviation amount (XM−5) from the in-focus position is calculated on the basis of this image deviation amount XM to determine the defocus amount DF and the lens drive amount. If the in-focus condition is detected, the in-focus display is effected, but if the out-of-focus condition is detected, the lens drive operation is carried out according to the detected amount of the lens drive distance.

On the contrary, if it is detected as a "Low Con", the correlation calculation is carried out in the other direction. Based on this result, the determination of the minimum correlation value and the interpolation are carried out to determine the image real shifting amount XM and the correlation evaluation function YM(XM)/CZ. Again, using this result, determination of "Low Con" is performed, and if it is not detected as "Low Con", the image deviation amount (XM−5) from the in-focus position is calculated to determine the defocus amount DF and the lens drive amount.

If the in-focus condition is detected, the in-focus display is effected, but if the out-of-focus condition is detected, the lens drive operation is carried out according to the detected amount of the lens drive distance.

Where it is detected as "Low Con" also in this direction, it means that both X- and Y-directions are in "Low Con", and therefore, the previously described "Low Con Scan" is effected.

Finally, explanation will be given of the operation of the focus detecting device shown in the flow chart of FIGS. 24a, 24b and 24c, wherein correlation calculation is performed preferentially in the X-direction (horizontal direction) in which a high contrast object is frequently arranged, while correlation calculation in the Y-direction is performed only when it is detected as "Low Con" in the X-direction. In this focus detecting operation mode, unlike the above two operation modes shown respectively in FIGS. 22a, 22b, and FIGS. 23a, 23b, only the data in the X-direction is preferentially inputted. In order to reduce the charge accumulation time period and the data transfer time period, and also to increase the system response, the microcomputer, at the time of completion of the initialization of the CCD image sensor subsequent to the start of AF operation, sets frequency of the transfer clocks to a value twice that in the above mentioned two operation modes. Furthermore, the microcomputer generates SΦ=Low, and produces outputs only in the X-direction at a high speed in the form as shown in FIG. 21b.

Subsequent to the application of the clear pulse ICG for initiating the charge accumulation, the microcomputer waits for inversion of a signal TINT1 indicative of the completion of the charge accumulation in the X-direction. Upon detection of the inversion of the signal TINT1, the microcomputer generates a shift pulse SH regardless of whether or not the charge accumulation at the PD arrays in the Y-direction has been completed, and starts the inputting of pixel outputs in the X-direction.

Since X-direction standard area pixel outputs of the PD array I are outputted from OS1, the microcomputer produces SZ=HIGH for causing the multiplexer 170 to output the I1 signals (that is, the OS1 outputs) from terminal D1, and takes them in after conversion into a digital form. During this period, a Y-direction standard output generated from OS2 are neglected. When the inputting of the X-direction standard area pixel outputs has been completed, the microcomputer generates SZ=LOW for causing the multiplexer 170 to generate the I2 signals (that is, the OS2 outputs from the image sensor, which are the X-direction reference area pixel outputs of the PD array III) from terminal D1, and takes them in after conversion into a digital form. Upon the completion of the inputting of the standard and reference area pixel outputs in the X-direction, the microcomputer, using these data, carries out the differential data preparation, the correlation calculation, determination of the minimum correlation value, the interpolation calculation and the "Low Con" determination in a manner similar to the previously mentioned two operation modes. As a result of the "Low Con" determination, if it is determined as being not "Low Con", meaning that the image shifting amount XM so obtained is a highly reliable data, the image deviation amount from the in-focus position P=XM−5 is calculated, followed by the calculation of the defocus amount DF and the lens drive amount. When the lens drive amount is extremely small, it is determined that the in-focus condition is attained and, therefore, the in-focus display is effected, but when it is not, the lens drive is effected according to the calculated lens drive amount. During the lens drive, the charge accumulation and the calculations for focus detection are again performed only for the X-direction and PD arrays.

On the other hand, if it is determined as being "Low Con" as a result of the "Low Con" determination in the X-direction, the microcomputer subsequently causes the PD arrays II and IV in the Y-direction to effect charge accumulation and performs the calculations for focus detection. To this end, the microcomputer generates the clear pulse ICG while outputting SΦ=LOW in order to execute the data input in the Y-direction, and waits for the inversion of the signal TINT2. Upon detection of the inversion of TINT2, it generates in shift pulse SH, regardless of whether or not the charge accumulation at the PD arrays in the X-direction has been completed, to initiate the inputting of data in the Y-direction. At this time, unlike the above case for inputting X-direction data, the microcomputer at first produces SZ=LOW for causing the multiplexer 170 to pass only the Y-direction standard area outputs I2 from the PD array II and takes them in subsequent to the analog-to-digital conversion. Upon completion of this, it produces SZ=HIGH for causing the multiplexer to pass only the Y-direction reference area outputs I1 from the PD array IV and takes them in subsequent to the analog-to-digital conversion.

When the whole data in the Y-direction have been completely inputted in this way, the microcomputer carries out the preparation of the differential data in the Y-direction, the correlation calculation, the determination of the minimum correlation value, the interpolation calculation and the "Low Con" determination in a manner similar to the X-direction. If it is detected as being not "Low Con" as a result of the "Low Con" determination, meaning that the image shifting amount XM so obtained is a highly reliable data, the image deviation amount from the in-focus position P=XM−5 is calculated, followed by the calculation of the defocus amount DF and the lens drive amount. When the lens drive amount is extremely small, it is determined that the in-focus condition is attained and, therefore, the in-focus display is effected, but when it is not, the lens drive is effected according to the calculated lens drive amount. During the lens drive, the charge accumulation and the calculation for focus detection are again performed for the Y-direction PD arrays, but no operation is carried out for the X-direction PD arrays.

On the other hand, if it is determined as being "Low Con" also in the Y-direction, it means that "Low Con" is found in both of the X-direction and the Y-direction and, therefore, the Low Con Scan is performed to repeatedly carry out the charge accumulation and the calculations for focus detection in both X- and Y-directions until "Low Con" disappears.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of the appended claims.

What is claimed is:

1. A focus condition detecting device for detecting the focus condition of an image of an object, comprising:

a plurality of pairs of arrays of sensor elements for receiving images of a plurality of separate portions of an object, said arrays in each pair aligned along an axis corresponding to a separate portion of the object, and the respective axes of each pair of arrays being offset from an axis of another pair of arrays, and a detecting means for detecting a focus condition for each separate portion of the object based on a mutual positional relationship between images of the same separate portion of the object formed on each pair of arrays.

2. A focus condition detecting device as claimed in claim 1, wherein the axis of one pair of arrays for one separate portion of the object is orthogonal to the axis of another pair of arrays for a different separate portion of the object.

3. A focus condition detecting device as claimed in claim 2 wherein each axis lies in a plane perpendicular to an optical axis from the object to the image.

4. A focus condition detecting device as claimed in claim 3 further including a view field mask having apertures defining the alignment of the respective axes.

5. A focus condition detecting device as claimed in claim 4 wherein the view field mask is positioned at a focal plane between the object and the image and refocusing means is provided between the view field mask and the arrays of sensor elements.

6. A focus condition detecting device as claimed in claim 5 wherein the refocusing means includes four lenses.

7. A focus condition detecting device as claimed in claim 5 further including a condenser lens positioned adjacent the view field mask.

8. In an automatic focusing camera having an objective lens system for providing an image of an object on a focal plane, the improvement comprising a focus condition detecting system including:

a plurality of pairs of image sensing arrays positioned in a plane perpendicular to an optical axis for receiving an image of an object from the objective lens system, each pair of image sensing arrays receiving a different portion of the object image, and an axis for each pair of image sensing arrays extending in a different direction from at least one other axis of the image sensing array, and detecting means for detecting a focus condition for each separate portion of the object based on a positional relationship between images of the same portion of the object image.

9. The automatic focusing camera of claim 8 wherein the axis of one pair of image sensing arrays is positioned orthogonal to another axis of another pair of image sensing arrays.

10. A focus condition detecting device as claimed in claim 9 further including a view field mask having apertures defining the alignment of the respective axes.

11. A focus condition detecting device as claimed in claim 10 wherein the view field mask is positioned at a focal plane between the object and the image and refocusing means is provided between the view field mask and the arrays of sensor elements.

12. A focus condition detecting device as claimed in claim 11 wherein the refocusing means includes four lenses.

13. A focus condition detecting device as claimed in claim 12 further including a condenser lens positioned adjacent the view field mask.

14. A focus detection apparatus for detecting a focus condition of an object image formed by an object lens, comprising:

a first sensor array comprising a plurality of sensor elements aligned in a first direction;

a second sensor array comprising a plurality of sensor elements aligned in a second direction;

an optical system for forming said object image on said first and second sensor arrays;

a first focus detection means for detecting the focus condition of said object lens based on image data obtained from said first sensor array in said first direction and for obtaining a first focus detection result;

a second focus detection means for detecting the focus condition of said object lens based on image data obtained from said second sensor array in said second direction and for obtaining a second focus detection result, and a priority setting means for setting a priority on said first focus detection result over said second focus detection result.

15. A focus detection apparatus as claimed in claim 14, wherein said first direction is a horizontal direction.

16. A focus detection apparatus as claimed in claim 15, wherein said second direction is a vertical direction.

17. A focus detection apparatus as claimed in claim 14, further comprising a reliability detecting means for detecting whether or not each of said first and second focus detection results has a predetermined reliability, and a selecting means for selecting the second focus detection result when said first focus detection result is detected as lacking the predetermined reliability.

18. A focus detection apparatus as claimed in claim 17, further comprising a drive control means for controlling the driving of said first and second focus detection means such that the second focus detection means is driven only when said first focus detection result is detected as lacking the predetermined reliability.

19. A focus detection apparatus for detecting a focus condition of an object image formed by an object lens, comprising:

a first sensor array comprising a plurality of sensor elements aligned in a first direction;

a second sensor array comprising a plurality of sensor elements aligned in a second direction;

an optical system means for forming said object image on said first and second sensor arrays;

a first focus detection means for detecting the focus condition of said object lens based on image data obtained from said first sensor array and for obtaining a first focus detection result;

a second focus detection means for detecting the focus condition of said object lens based on image data obtained from said second sensor array and for obtaining a second focus detection result;

a condition detection means for detecting which one of said first and second directions has a predetermined requirement;

a selecting means for selecting one of the first and second focus detection results corresponding to the detected direction;

a reliability detecting means for detecting whether or not said selected focus detection result has a predetermined reliability, and a control means for controlling said selecting means to select the other focus detection result when said selected focus detection result lacks the predetermined reliability.

20. A focus detection apparatus as claimed in claim 19, wherein said condition detection means is a contrast detection means for detecting which one of the first and second directions has the highest contrast.

21. A focus detection apparatus as claimed in claim 20, wherein each of said first and second sensor arrays comprises a pair of first and second sensor elements, said objective lens means forming an image individually on said first and second sensor elements, and wherein each of said first and second focus detection means comprises a calculation means for calculating a correlation of the object images on said first and second sensor elements, whereby said focus condition is detected by said correlation.

22. A focus detection apparatus as claimed in claim 21, wherein said reliability detecting means detects the reliability based on said correlation.

23. A focus detection apparatus for detecting a focus condition of an object image formed by an object lens, comprising:
  a first sensor array comprising a plurality of sensor elements aligned in a first direction;
  a second sensor array comprising a plurality of sensor elements aligned in a second direction;
  an optical system for forming said object image on said first and second sensor arrays;
  a first focus detection means for detecting the focus condition of said object lens based on image data obtained from said first sensor array in said first direction and for obtaining a first focus detection result;
  a second focus detection means for detecting the focus condition of said object lens based on image data obtained from said second sensor array in said second direction and for obtaining a second focus detection result;
  a selecting means for selecting one of said first and second focus detection results that has cleared a predetermined requirement;
  a reliability detecting means for detecting whether or not said selected focus detection results has a predetermined reliability, and
  a control means for controlling said selecting means to select the other focus detection result when said first selected focus detection result lacks the predetermined reliability.

24. A focus detection apparatus as claimed in claim 23, wherein said selecting means comprises a contrast detecting means for detecting the contrast of said object image formed on said first and second sensor arrays, whereby said selecting means selects one of the first and second focus detection results corresponding to the object image having the highest contrast.

25. A focus detection apparatus for detecting a focus condition of an object image formed by an object lens, comprising:
  a first sensor array comprising a plurality of sensor elements aligned in a first direction;
  a second sensor array comprising a plurality of sensor elements aligned in a second direction;
  an optical system for forming said object image on said first and second sensor arrays;
  a first focus detection means for detecting the focus condition of said object lens based on image data obtained from said first sensor array in said first direction and for obtaining a first focus detection result;
  a second focus detection means for detecting the focus condition of said object lens based on image data obtained from said second sensor array in said second direction and for obtaining a second focus detection result;
  a reliability detecting means for detecting whether or not each of said first and second focus detection results has a predetermined reliability, and
  a disable signal producing means for producing a disable signal indicative of disabling of the focus detection function when said first and second focus detection results lack the predetermined reliability.

26. A focus detection apparatus as claimed in claim 25, further comprising a display means for displaying the disabling of said focus detection when said disable signal is produced.

27. A focus detection apparatus as claimed in claim 26, further comprising:
  a lens drive means for driving a focusing lens provided in said object lens, and
  a drive control means for driving, when said disable signal is produced, said lens drive means, said first and second focus detection means, and said reliability detecting means.

28. A focus detection apparatus as claimed in claim 27, wherein said display means displays the disabling of said focus detection when, after the driving of said lens drive means, said first and second focus detection results lack the predetermined reliability.

29. A focus detection apparatus for detecting a focus condition of an object image formed by an object lens, comprising:
  a first sensor array comprising a plurality of sensor elements aligned in a first direction;
  a second sensor array comprising a plurality of sensor elements aligned in a second direction;
  an optical system for forming said object image on said first and second sensor arrays;
  a first focus detection means for detecting the focus condition of said object lens based on image data obtained from said first sensor array in said first direction and for obtaining a first focus detection result;
  a second focus detection means for detecting the focus condition of said object lens based on image data obtained from said second sensor array in said second direction and for obtaining a second focus detection result;
  a reliability detecting means for detecting whether or not said first focus detection result has a predetermined reliability, and
  a drive control means for driving said first focus detection means, and then said second focus detection means only when said first focus detection result lacks the predetermined reliability.

30. A focus detection apparatus for detecting a focus condition of an object image formed by an object lens, comprising:
  a plurality of sensor arrays which are aligned in different directions;
  an optical system for forming said object image on said first and second sensor arrays;
  a focus detection means for detecting the focus condition of said object lens based on image data obtained from one of said sensor arrays and for obtaining focus detection results from said sensor arrays, respectively;

an order setting means for setting a priority order among said plurality of sensor arrays;

a reliability detecting means for detecting whether or not each focus detection result has a predetermined reliability, and a selection control means for selecting a focus detection result from the sensor array with the highest priority after excluding the sensor arrays with the focus detection results that lack the predetermined reliability.

31. A focus detection apparatus as claimed in claim 30, wherein said selection control means controls the operation of said focus detection means such that the sensor array with the highest order is operated to obtain the reliability of the focus detection result thereof, and then the sensor array with the next higher order is operated, only when the first obtained reliability lacks the predetermined reliability, to obtain the reliability of the focus detection result thereof.

32. A focus detection apparatus as claimed in claim 30, wherein said priority order is previously determined.

33. A focus detection apparatus as claimed in claim 31, wherein a sensor array aligned horizontally has the highest priority order.

34. A focus detection apparatus as claimed in claim 30, further comprising a contrast detecting means for detecting the contrast of each object image formed on said plurality of sensor arrays, and wherein said priority order is determined relative to the detected contrast.

35. A focus detection apparatus as claimed in claim 34, wherein said priority order is determined such that the higher priority is given to the sensor array with the object image having the highest contrast.

36. A focus detection apparatus for detecting a focus condition of an object image formed by an object lens, comprising:

a first sensor array comprising a plurality of charge accumulation-type sensor elements aligned in a first direction;

a second sensor array comprising a plurality of charge accumulation-type sensor elements aligned in a second direction;

an optical system for forming said object image on said first and second sensor arrays;

a focus detection means for detecting the focus condition of said object image based on image data obtained from said first and second sensor arrays and for obtaining a focus detection result;

a monitoring means, having a light receiving means located in the vicinity of said first and second sensor arrays to receive light from said object, for monitoring the amount of light received by said first and second sensor arrays, and a charge accumulation control means for controlling, based on the monitored result, the amount of charge accumulated in said first and second sensor arrays.

37. A focus detection apparatus as claimed in claim 31, wherein said monitoring means comprises first and second light receiving elements, respectively located in the vicinity of said first and second sensor arrays, and wherein said charge accumulation control means controls said first and second sensor arrays individually.

* * * * *